(12) United States Patent
Williames

(10) Patent No.: US 6,539,883 B1
(45) Date of Patent: Apr. 1, 2003

(54) HANDLING AND PLANTING PLANTS

(75) Inventor: Geoffrey Alan Williames, Warragul Victoria (AU)

(73) Assignee: Williames Hi-Tech International Pty Ltd., Warragul (AU)

( * ) Notice: Subject to any disclaimer, the term of this patent is extended or adjusted under 35 U.S.C. 154(b) by 0 days.

(21) Appl. No.: 09/603,268

(22) Filed: Jun. 23, 2000

(30) Foreign Application Priority Data

Jun. 23, 1999 (AU) .............................................. PQ1161

(51) Int. Cl.$^7$ .............................................. A01C 11/00
(52) U.S. Cl. ...................................... 111/109; 111/919
(58) Field of Search ................................ 111/109, 112, 111/111, 113, 114, 115, 102, 200, 900, 907, 909, 919, 149, 152, 192, 193

(56) References Cited

U.S. PATENT DOCUMENTS

| | | | |
|---|---|---|---|
| 4,112,857 A | * | 9/1978 | Bradley |
| 4,289,080 A | * | 9/1981 | Penley |
| 4,364,316 A | * | 12/1982 | Paladino |
| 4,438,710 A | * | 3/1984 | Paladino |
| 4,454,829 A | * | 6/1984 | Sena |
| 4,750,439 A | * | 6/1988 | deGroot |
| 4,934,290 A | * | 6/1990 | Benest ........................ 111/105 |
| 4,970,972 A | * | 11/1990 | Williames ................... 111/111 |
| 5,159,887 A | * | 11/1992 | Poll ............................ 111/109 |
| 5,224,554 A | * | 7/1993 | Poll ............................ 172/772 |
| 5,676,072 A | * | 10/1997 | Williames ................... 111/105 |

FOREIGN PATENT DOCUMENTS

| | | | |
|---|---|---|---|
| EP | 0612466 A1 | * | 8/1994 |
| FR | 2575030 | * | 6/1986 |

* cited by examiner

Primary Examiner—Christopher J. Novosad
(74) Attorney, Agent, or Firm—Reising, Ethington, Barnes, Kisselle, Learman & McCulloch P.C.

(57) ABSTRACT

The present specification discloses plant or seedling planting apparatus for planting a plant or seedling in a prepared ground position, the planting apparatus including a plant delivery chute leading to a position adjacent to the planting position, a conveyor adapted to carry sequentially a plurality of the plants and to eject same sequentially into an inlet region of the delivery chute, the conveyor also being bodily moveable between a first position adapted to receive a plurality of the plants and a second position at or adjacent the inlet region of the delivery chute, and controls for ejecting at least one plant into the delivery chute while the conveyor is moving towards or is at its second position and to sequentially eject at least one of the plants into the delivery chute while the conveyor is moving towards or is at its first position, such apparatus further including a planting shoe adapted to form the ground planting position and including a furrow forming forward end, a shell and a plant receiver to receive a plant within the shell from the delivery chute, and a rear end, the planting shoe further including a pusher to eject a plant rearwardly through the rear end if the shell back to a point of closure of the ground soil behind the shoe.

27 Claims, 19 Drawing Sheets

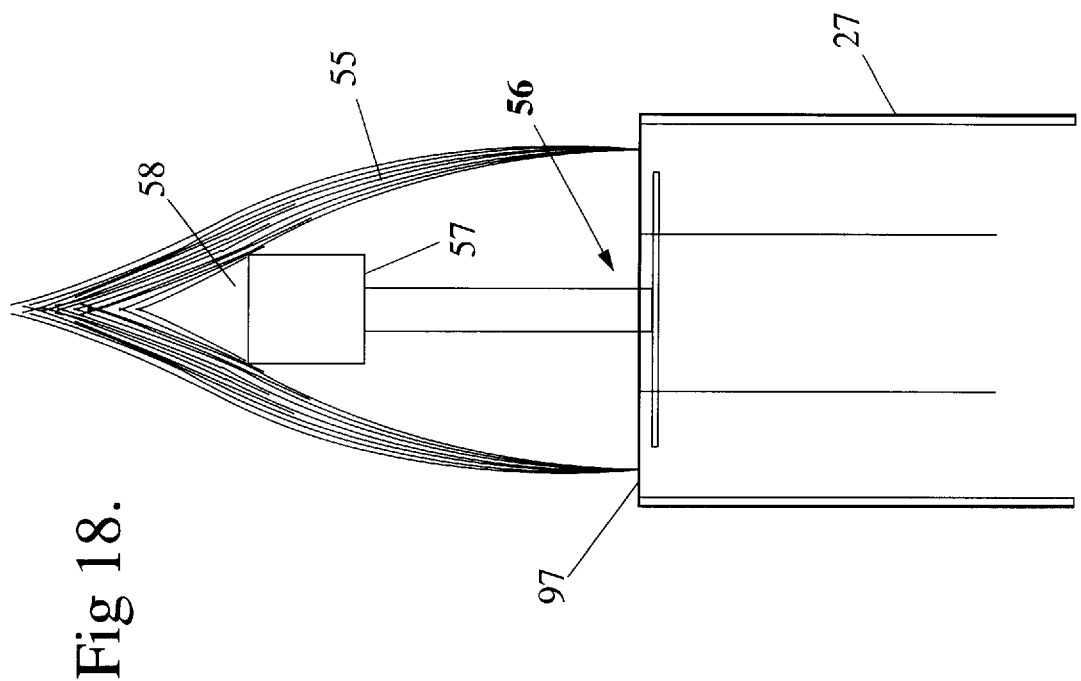
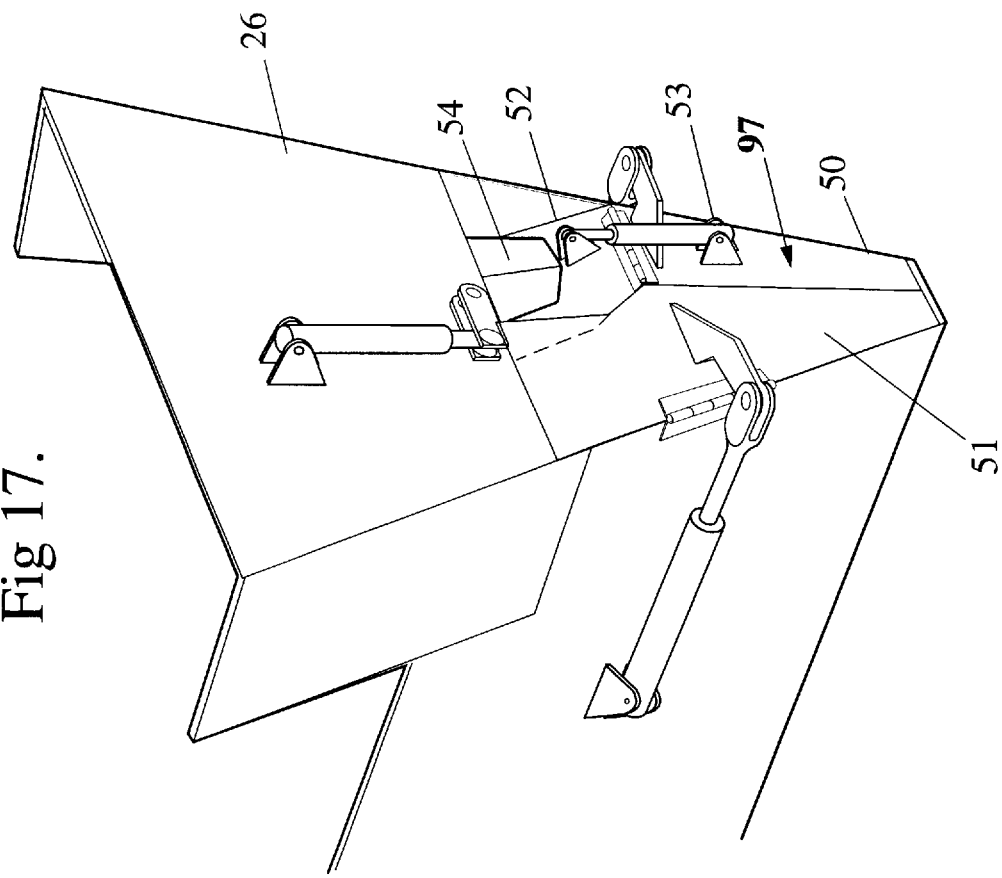

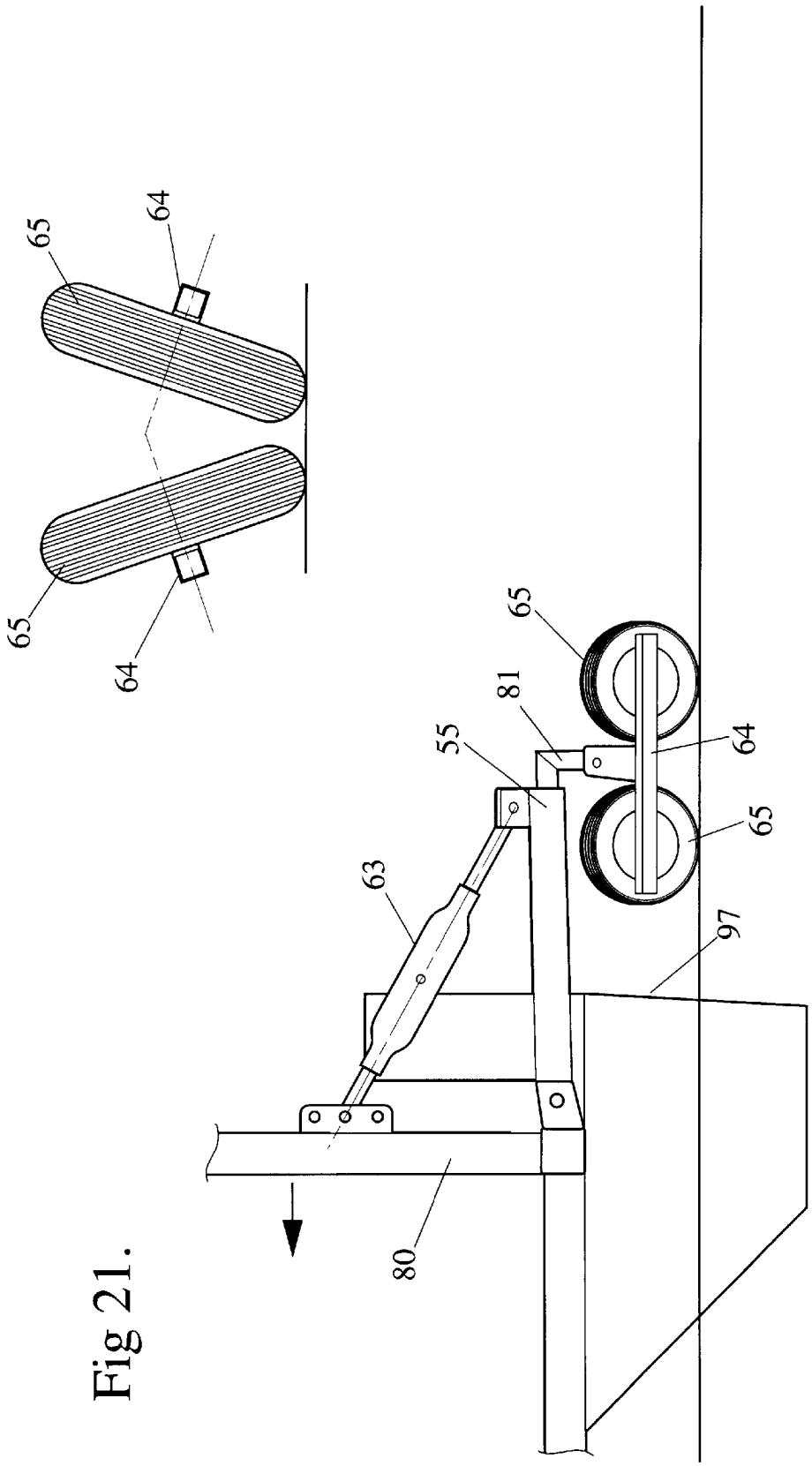

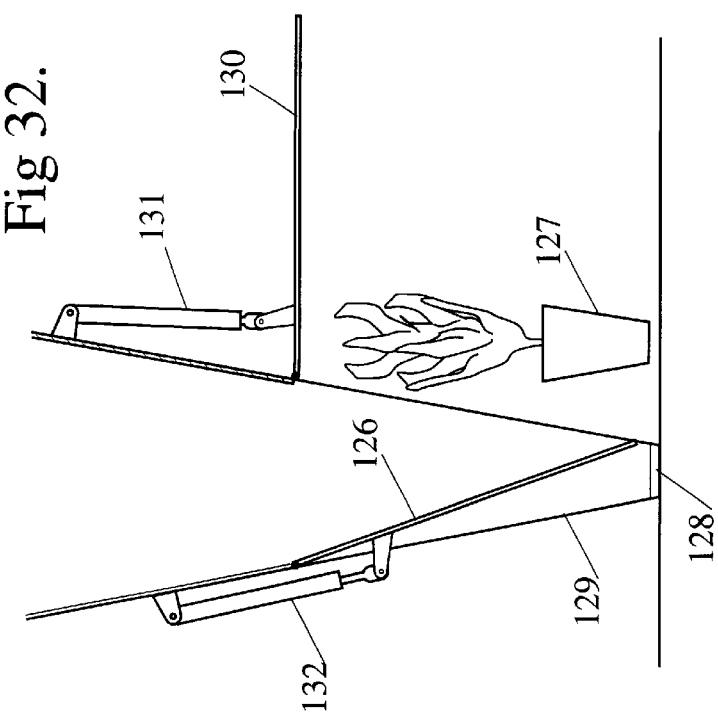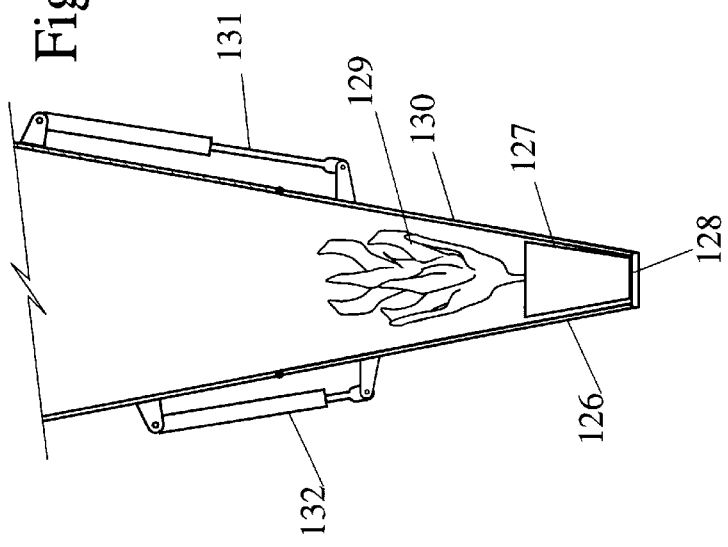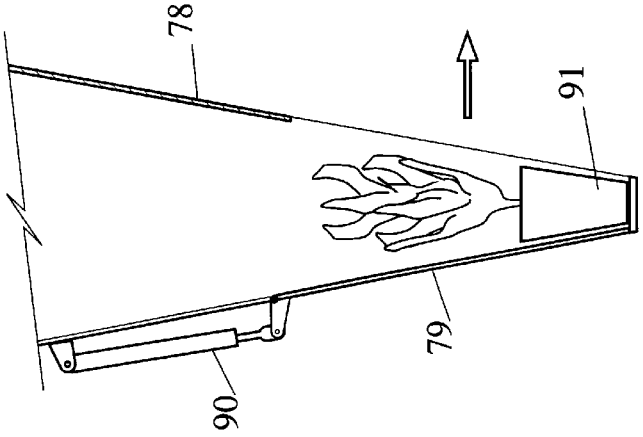

HANDLING AND PLANTING PLANTS

BACKGROUND OF THE INVENTION

1. Field of the Invention

The present invention relates to various improvements in equipment, apparatus and devices for handling and placing plugs and plants into soil and growing mediums.

2. Description of the Relevant Art

To achieve maximum economic returns it is necessary to plant plants at a precise depth, these plants are to be vertically positioned and at a uniform, precise distance plant to plant along the row, with each position being occupied by a live plant.

To achieve this in the past it has been necessary to have a substantial input of hand labour straightening plants and hand planting plants into positions not being occupied by plants. It has been found that the degree in which soil has been compressed around the plug will seriously effect the development of the root system, plant growth, and ultimate crop yields. If, for example, the soil is loosely filled around the plug, then a partial form of aerial root pruning occurs slowing down the speed at which the roots can spread. If the plug is positioned so that the top of the plug is above the top of the soil, then a form of wicking occurs causing the moisture that rises upwardly into the upper regions of the plug by capillary action, to be totally exposed to wind and sun which rapidly removes the moisture from the plug causing water stress, wilting, and in extreme cases, the plants death.

For the majority of cases, a shoe opening device is used to separate the soil ready to receive a plug containing a plant. By the nature of a continuous trough being formed in the soil it has proved difficult to properly compress the soil immediately behind and in front of the plug. This is further exacerbated by high speed planting which causes the soil to act like the wake behind a speed boat with the shoe travelling at a greater forward speed than it takes for the soil to envelop the plug. Also the greater the speed, the longer the distance is behind the soil opening device before the soil closes behind the "wake" and totally envelops the plug.

Traditionally a mechanical linkage attached to a pusher block pushes out the plug and plant, but the pusher block only extends to the rear edge of the furrow opening shoe. This has been done to avoid contact with the soil and to avoid the transport of the soil back inside the shoe. However the result traditionally is that the plug is not handled beyond being placed loosely in the open trough following the forward moving shoe and results in very uneven placement of the plants.

Traditionally a timed mechanical pushing assembly works proportionate to the forward speed of the machine and must be mechanically timed to coincide with the variability of the drop speed of the variable weight and size of the plug and plant. Previously and traditionally, the back of the soil opening device or shoe, has remained open allowing the premature escaping of the plant and inaccurate placement and possible dislodgment of the plant by external wind. This problem has been partly addressed in Williames International Patent Application No. PCT/AU97/00893 now U.S. patent application Ser. No. 331906, using a vertical guillotine door, but on this basis there are limitations to the speed in which plants are contained and released, with the bottom half of the door clearing the top of the foliage and re-shutting in time to properly contain the next plug and plant. For high speed planting, this system precludes the possibility of placing more than two plants per second when planting tall plants.

Traditionally the means of leveling and compressing the soil around a plug has been by means of large diameter steel wheels or a ski. The steel wheels by their nature of rolling resistance have to be of a large diameter to support the weight, and consequently preclude the ability to put a series of machines side by side for close row spacings. Alternatively, a ski is used which is dragged across the surface of the soil, but is prone to relatively rapid wear and it is undesirable to have a ski dragged across muddy fields due to the rolling up of the surface of the soil. This, by its nature precludes the use of the machines on wet days and shortens the time frames that the machine can be used on saturated soils.

In some crops, e.g. lettuce, the accuracy of the top of the plug relative to the top of the soil has a profound impact on the volume and quantity of marketable lettuce heads produced. If the plug is below the soil level two very serious things occur:

1) The soil envelops the lower portion of the lettuce leaves which can cause crown rot, with the consequent loss of the complete plant;

2) If the plant survives the outer leaves of the young lettuce plant are unable to flatten out in a semi horizontal position, but instead are held in a firm angular position. This prevents the subsequent lettuce leaves from obtaining the correct profile to form a largely circular lettuce head, and instead is formed into a looser high crowned oval shape similar to an American or Australian football. A lettuce head formed in this manner is totally unacceptable for commercial usage and is left in the field, mostly as wastage.

A similar effect to that described above, is also caused if the plug and plant are planted on a semi inclined plane, with part of top surface of the plug protruding above the surface, and part of the top surface of the plug buried under the surface of the soil.

Whether it is a machine in which the plants are fed by hand, dropped by cups, or fed by semi automatic or automatic mechanisms, all these plants are affected by the degree of water saturation of the root and soil mass. Also the weight of the plug varies substantially throughout the day due to evaporation, transpiration of moisture in the plugs and the effect of rain showers on the plugs and plants in trays waiting in the field to be transplanted. This weight variation effects the speed of which the plug and plant falls and the inertial effect of the horizontal transfer of the plug from the planting shoe. The size and length of the foliage has a substantial effect on the ability of a plant to remain vertically erect due to inertial forces involved in the movement through the soil, wind resistance on the foliage at the time of rapid vertical and horizontal movement during plant/plug transfer stages, and also any external wind sources.

Traditionally there have been three methods employed to handle plants from their growing containers to the planting position and into the ground.

1) Plants are manually pulled from the container, separated by hand and either manually placed into grippers or dropped down a tube.

2) Plants are manually removed from the growing containers, separated manually and placed into rotating cups which release the plants at the correct position and the plants fall down a tube.

3) Singular plants are mechanically ejected from the container one at a time and dropped down a plant tube.

4) A complete row of plants are mechanically ejected from the containers and into a plug retaining belt which swings away from the containers, separating the row of plants and then indexing forward and dropping one plant at a time into a drop tube.

In all of these approaches it is important to clearly separate the foliage from the plant to be dropped from the remaining stationary plants immediately above, and is a prerequisite to the unhindered proper handling of an individual plug and plant to be accurately placed in the ground.

In the type of planter that transfers an entire row of plants into a plug retaining belt which then swings away, separating the plants to a lower region, and then dispensing the plants one at a time, the speed of the machine in terms of continuous, uninterrupted plants evenly spaced in the field, is determined by the time it takes for the plug retaining belt to swing up, be loaded and return to the planting position. This has been partly addressed in the aforesaid Williames International Patent Application No. PCT/AU97/00893 by dispensing a plant on the conveyor upswing before loading another row of plants.

A common problem with all planting machines is that plants are often grown in clay type soil which stick, to and build up on, the soil opening device causing a wide trough or groove to be formed in the soil. This allows the transferred plug and plant to be placed in an uncontrollable manner and position. This precludes the possibility of properly compressing the soil around the plug.

SUMMARY OF THE INVENTION

It is an object of this invention to address the foregoing problems and requirements either individually or together as a whole for improved or proper handling and placement of plugs and plants and further to preferably have the ability for the farmer and market gardener to meet the many and varied demands often present on the one farm, and even within the one field. Desirably transplanting apparatus needs to respond to the many and varied circumstances encountered by a contractor who usually transplants on a number of farms in widely variable circumstances.

The invention provides for a machine with fast interchangeable clip/pin or bolt on attachments as a unique system that improves the handling and placement of plugs and plants regardless of the substantial variations and conditions. These variations and conditions include the following:

1) Soil types and conditions; fine dry powdery soil, loose soil, heavy clay soil, wet sticky soil, muddy soil, firm and hard soil, cloddy soil, soil mixed with vegetative materials, e.g. grasses and trash from previous crops.
2) Plant and plug conditions; tangled plants, tall single stemmed plants e.g. tomatoes and peppers, multi stemmed tall plants e g. onions and leeks, broad foliage plants e.g. lettuce and celery, semi dry plugs, saturated plugs and plants, wind-buffeted plants and knocked down plants.
3) External variables: very hot and dry conditions, windy conditions, rain, formed beds, unformed beds, uniform beds, mulch planting beds with bed covering, including plastic sheet.

When such plants as, brassica, cauliflower, broccoli, cabbage, are grown in close proximity to each other, they tend to 'zip lock' to each other, the stems criss-cross and the rounded bud of the leaves grow in behind the adjacent stems interlocking the individual plants to their neighbors.

Tomatoes, although they grow on a relatively vertical stem, have individual branches and leaves which curl out horizontally and down and around to form a hook. The formation of the leaf structure in combination with this hooking effect, causes the individual plants to act like a grapple, tenaciously intermeshing and hanging on to the adjacent plants. This invention, in one aspect, provides an improvement for separating individual plants by means of a rotating comb. A major improvement includes a means of retaining a plug in a plug retainer and combining with close tolerance to a curved backboard. This assures that the plug is very substantially restrained and that the plant top cannot escape from the path of the rotating comb finger which forcibly passes between the plant stems and disentangles the interlocked foliage. This leaves the adjacent plants absolutely free from any entanglement or hindrance to proper handling.

To ensure that an even and regular supply of plants are available on an individual basis for continuous high speed planting, this invention, in accordance with another aspect, provides for automatic machines that include mechanical plug retaining systems containing a complete row of transferred plants. It is the aim of this invention to not only dispense one or more plants on the upward swing of the feed conveyor to reload, but also to dispense a second plant or plants on the swing down after having loaded and prior to coming to rest at the fully down, normal plant dispensing position. By this means, a normal machine plug conveying mechanism will swing up, load and swing down in 750 milliseconds. This means that the dispensing conveyor will have dispensed a plant immediately prior to the upswing, a further plant on the upswing, a further plant immediately after loading and commencing down swing, and another plant immediately when required when returned to the fully down dispensing position. Considering that the first, second and third plants have been dispensed in 750 milliseconds, this equates to 250 milliseconds between the dispensing of each plant, which will give an effective planting rate of four plants per second which is a major improvement on all existing mechanical transplanters.

To allow the control of plants that have been individually dropped whether it is by hand, from semi-automatic or fully automatic transplanters, this invention provides, in a still further aspect, a dual path for a secondary/alternative plant storage system. This ensures continuity and proper timing of plants for uniform plant spacing during the interchange between rows of plants on an automatic machine, or transfer of trays on semi-automatic or manual machinery.

This invention provides for the combing, dispensing and dual path control to be mounted at a very short distance from the horizontal plant handling transfer into the soil. This means that the drop time from plant discharge from whatever means, is less than 250 milliseconds regardless of the size and moisture content of the plug and the size and length of the plant foliage and will, as described above, plant four plants per second. This ensures proper control of the handling and placement of plants at four plants per second without missing intermittent plants at high planting speeds or risking overlap causing a doubling up of plants, placing two plants together with a subsequent gap.

This mechanism is directly coupled to the soil-opening shoe. This invention provides for being either a fixed shoe, adjustable width shoe or rotating discs which prevent the build up of mud and allows a clean uniform width of soil opening to receive the proper placement of the plug and plant. It also provides for an automatic mud scraping system on the sides of a planting shoe to work properly in muddy and sticky conditions.

This invention provides, in another aspect, for a push device which protrudes beyond the rear edge of the planting shoe and pushes the plug back into the point of closure of soil behind the shoe even during high speed planting. This push device is controlled by and attached to a pneumatic cylinder and roller guide system well above the level of contamination from the soil. This ensures free running and high speed planting. It is also interconnected with a horizontal plate that ensures mechanical separation of plants that are in the process of being planted from the plant that is immediately following. It is also self-cleaned on retraction. This plate is also positioned to push on the foliage of the plug being planted at the same time as the base of the pushing mechanism pushes on the plug, which prevents overturning from inertial forces during the ejection of the plug from the shoe into the soil.

This invention provides, in another aspect, for a special shaped pushing mechanism to push on the plug without engaging the soil that is closing and enveloping the sides of the plug. It provides for a spring-loaded hinged mechanism for shoe internal cleaning and flushing. The roller system for guidance and smooth linear transfer, and the pneumatic cylinder, whose speed can be varied to control inertial effect and allow the instantaneous planting controlled by the precise distance traveled, thus ensuring the absolute accuracy and uniformity of plant spacing, plant to plant along the row regardless of the prime mover and planter speed variation.

The invention also separately provides for a unique means of completely containing a plug and seedling to ensure that it is in the correct location vertically, and free from any influence from the passage of soil and external wind. By using vertical twin doors to which a dud ejecting deflector, in one embodiment of the invention, can be fitted to an upper portion of one door, allows for the sorting of plugs not containing a plant and very rapid opening of the complete rear aperture of the planting shoe. This allows the passage of the highest plants with no additional delay regardless of the height of the plant. As the doors are on a vertical axis they are able to close quickly behind the planted plant without impinging on the plants upper foliage and be ready to receive the second plant. By this means concise control of the plants can be maintained while planting at very high speeds. The means are also provided for the pushing assembly to be self-leaning on retraction.

For high speed planting it is desirable to ensure that the open furrow behind the soil-opening device is closed evenly and consistently around the planted plug and plant. This is achieved, in one preferred embodiment, by a pair of pneumatic smooth skinned tires, ribbed tires or conical shaped wheels. These tires or conical shaped wheels are fitted to an adjustable framework allowing the position and angle of the wheels to be adjusted as follows 1. The wheels can be moved backward and forward to alter the distance between the wheels and the soil opening device, depending on the soil type and condition to ensure the proper movement of soil to envelop the plug.
2. The vertical plane of the wheels can be rotated about an axis to allow the top of the wheels to be a greater distance apart than at the base. This arrangement when using a small diameter wheel and held in an inclined plane, will roll in a substantial amount of soil and compact it completely around the plug, the amount of soil being moved being proportionate to the type of soil and the vertical angle of the wheels or cones.

There is also provision where it is necessary to have extreme control of the placement of the plant relative to the surface of the soil and to have a flat bed, for example, planting lettuce, it is necessary in one preferred embodiment, to have a tandem set of small diameter wheels, each pair or series of wheels being longitudinally and independently mounted on a rocker assembly which provides a stable load carrying assembly. An added advantage of using small diameter wheel is that it allows for close proximity machine to machine for close row spacing planting. The smaller radius of the front pair of vertically inwardly sloping wheels provides an adjustable means of varying the amount of soil being transferred inwardly and compressed around the plug. The second rear pair of wheels provide increased flotation and can be fitted, in one preferred embodiment, with cone shaped wheels. These wheels are adjustable on their axis to provide the placement of the inner edge of the lower portion of the cone in the desired location relative to the plant and plug. The angle of these cone shaped wheels can be adjusted to any desired bed shape including an absolutely flat bed. This assembly is also vertically adjustable and because of the tandem action and wide spread support enables precise depth control of the placement of the plant relative to the surface of the soil by maintaining a precise location of the planting mechanism relative to the surface of the soil.

The scope of the inventive aspects as defined herein are as set out in the annexed claims or as defined in any aspect or feature of the current description. The annexed claims should be regarded as part of the present disclosure.

BRIEF DESCRIPTION OF THE DRAWINGS

There are shown in the drawings embodiments which are presently preferred it being understood, however, that the invention is not limited to the precise arrangements shown therein. In the drawings:

FIG. 17 is a view similar to FIG. 16 showing the rejecting mechanism in a position of use;

FIG. 18 is a schematic plan view showing the plant being pushed into a planting position adjacent the point of soil closure;

FIG. 21 is a view similar to FIG. 19 showing an alternative embodiment;

FIGS. 22 and 23 are schematic rear views of the alternative arrangements for use with the embodiment of FIG. 21;

FIGS. 25, 26 and 27 are schematic rear views showing a possible sequence of steps for delivering plants to side by side planting shoes or the like;

FIGS. 30, 31 and 32 are alternative preferred arrangements for discharging a plant to a planting position from the end of a delivery chute.

DETAILED DESCRIPTION OF THE PREFERRED EMBODIMENTS

The following description describes in detail certain improved embodiments for handling, delivering and discharging a plant or seedling to a prepared ground planting position, it being understood that the planting apparatus may also include handling apparatus or devices of the type disclosed in U.S. Pat. Nos. 4,970,972, 5,676,072, 548,802 and International Patent Application No. PCT/AU97/00893 (now U.S. patent application Ser. No. 331,906) for removing plants or seedlings with their growing medium plug from trays, containers or the like in which they have initially been grown.

Several preferred features and aspects will be better understood from the following description given in relation to the accompanying drawings, the nature of which will be apparent from the following description.

Figure 1:
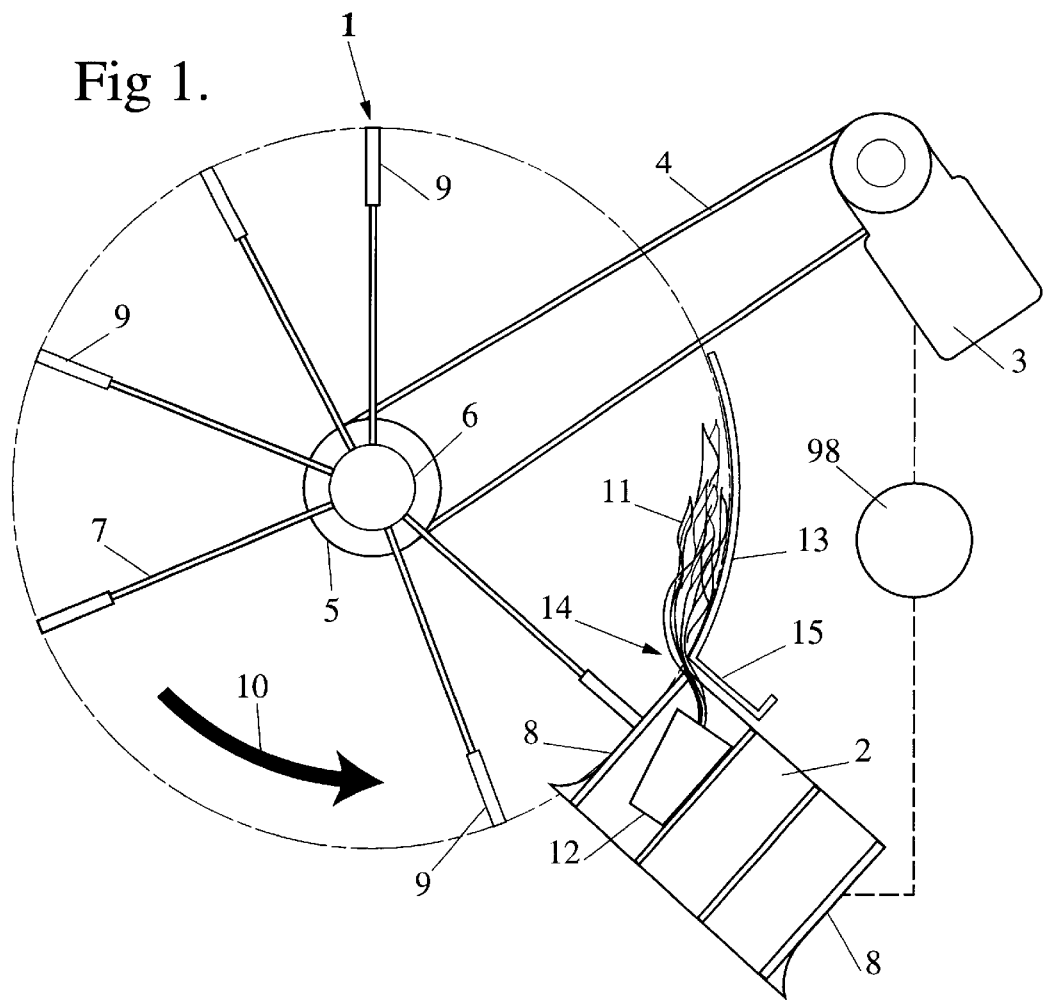
FIG. 1 is a schematic side view of one preferred form of combing arrangement.
Figure 2:
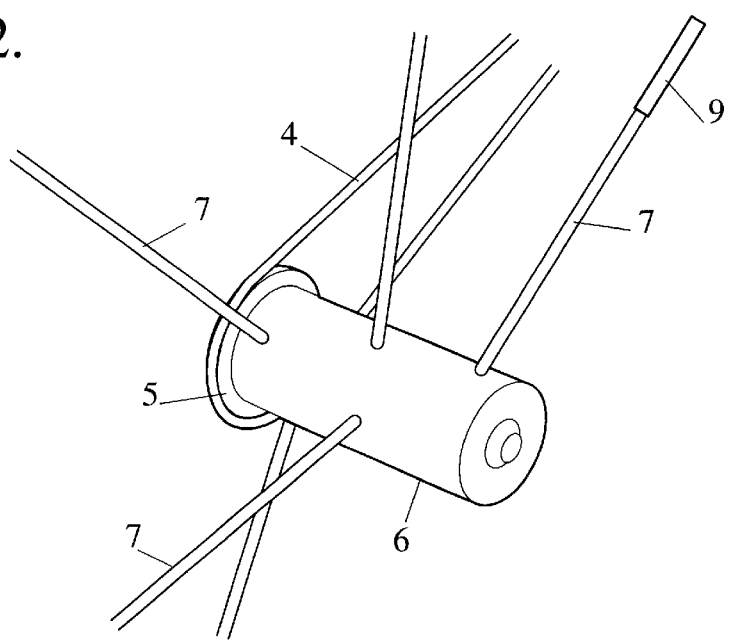
FIG. 2 is a partial perspective view of the combing device shown in FIG. 1.

FIG. 1 shows an end elevation of a comb assembly (1) and a cross section through a feed conveyor (2). In one preferred embodiment a small drive unit (3) drives a belt (4) which in turn rotates the comb pulley (5). Mounted on the comb spoke mount extension tube (6) (FIG. 2) are the foliage separating spokes (7). These spokes are distanced apart along the tube at the correct pitch of plant retainers (8) on the feed conveyor (2). At the end of each spoke are relatively soft finger extensions (9) which, as the comb rotates in the direction of arrow (10), sweep on an arc through the foliage (11) of plant and plug (12). Due to this sweeping action the rotating spokes separate the foliage of the plant being combed from the foliage of adjacent plants. To stop the spokes (7) from pulling the plants out of the receptacle (8) during rotation, a curved back panel (13) (curved to the same radius as the end of the spokes) is mounted at a tangent to the plug retainer at point (14). A folded edge (15) vertically covers the open ends of the plant/plug retainers (8), thereby stopping any movement of the plug/plant (12) out of the retainer (8) when being combed in the direction of arrow (10), by the spokes of the rotating comb assembly (1).

Figure 3:
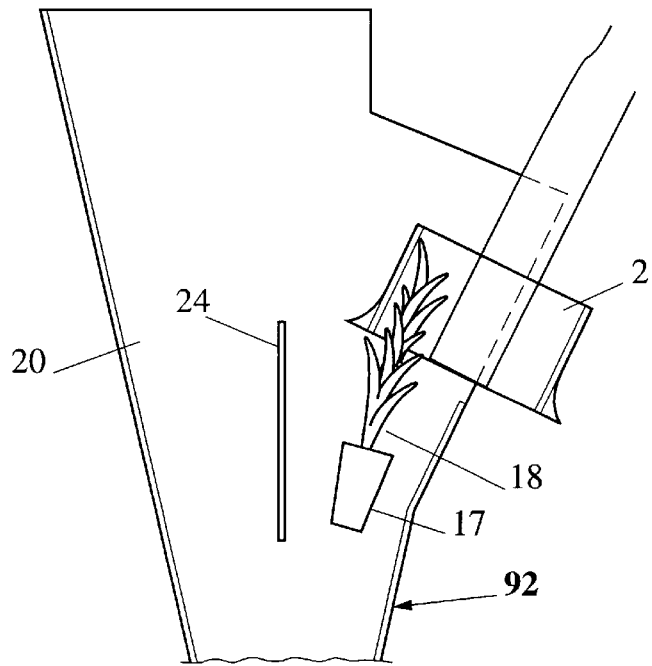
FIGS. 3, 4, 5 and 6 are schematic side views showing a sequence of release of plants from a conveyor into a delivery chute in accordance with one preferred embodiment.
Figure 4:
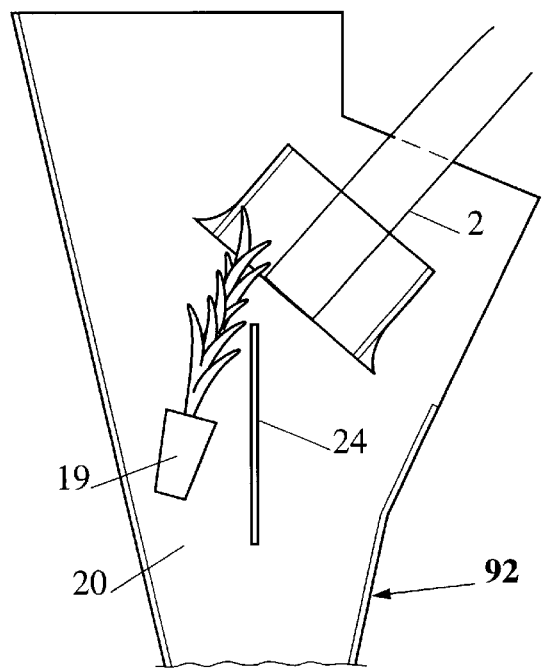
Figure 5:
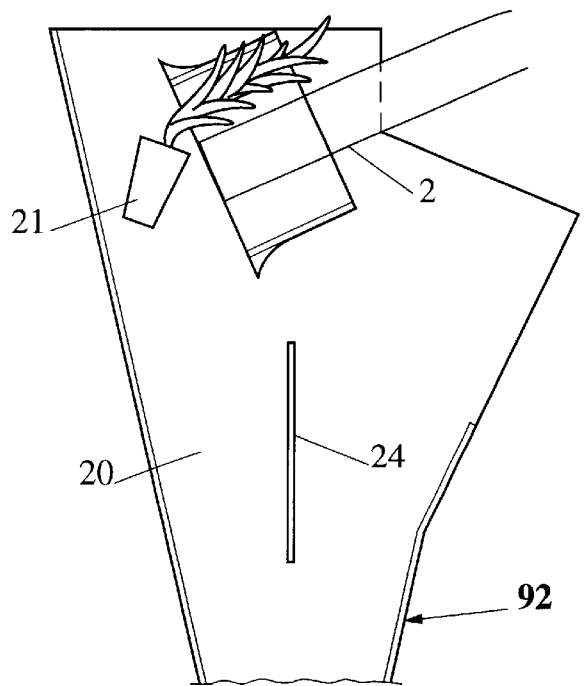
Figure 6:
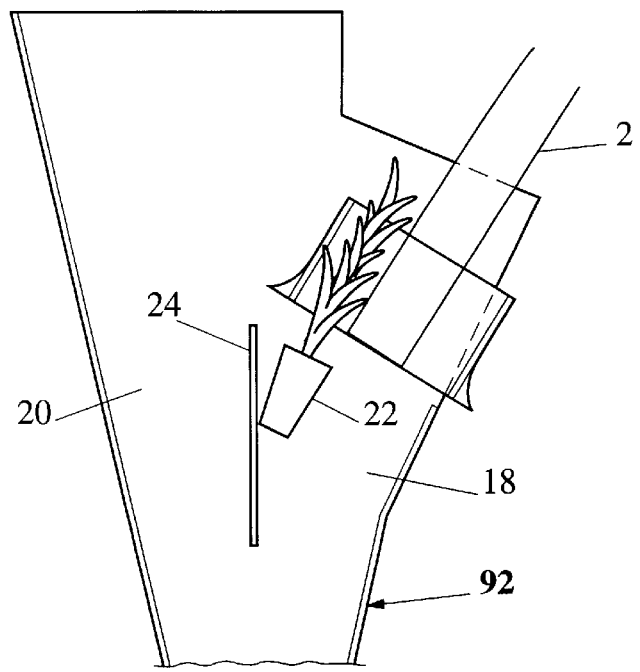

Once combed and separated the plug/plants are dispensed from the plug-retaining belt into a receptacle which has dual entry points for dispensed plug and plants. This receptacle is an integral part of the soil-opening device (see FIG. 9). When the conveyor (2) is in its fully down position (93) (FIG. 3) and has dispensed the last plant (17) of the cycle into receptacle (18) of a plant delivery chute (92), the conveyor then immediately starts to swing up to reload another row of plants from the tray. On the way up the belt indexes once and dispenses the first plant (19) into the second receptacle (20) (FIG. 4) of the plant delivery chute (92). It then continues and loads another row of plants at a second position (94). As soon as it has commenced its downward swing it dispenses a second plant (21) into the second receptacle (20) (FIG. 5), then when near the end of its downward swing it dispenses a third plant (22) into receptacle (18) (FIG. 6). When fully at rest at the end of its down swing the conveyor dispenses a fourth and last plant (23) for that cycle (FIG. 3) again. As discussed in the introduction, it takes 750 milliseconds for the belt conveyor (2) to complete one complete cycle (one swing from fully down/swing up/load/swing down/ to fully down), and at 250 milliseconds between dispensing plants, this equates to four plants per second. A controller device (98) may be provided to control sequencing and other functions of the apparatus including bodily movement and indexing movement of the conveyor (2) in response to predetermined inputs and sensed inputs such as the position of viable live plants at various positions. The controller device may control other aspects of the apparatus including operation of the comb assembly, and the plant positioning and reject devices as described hereinafter.

Figure 7:
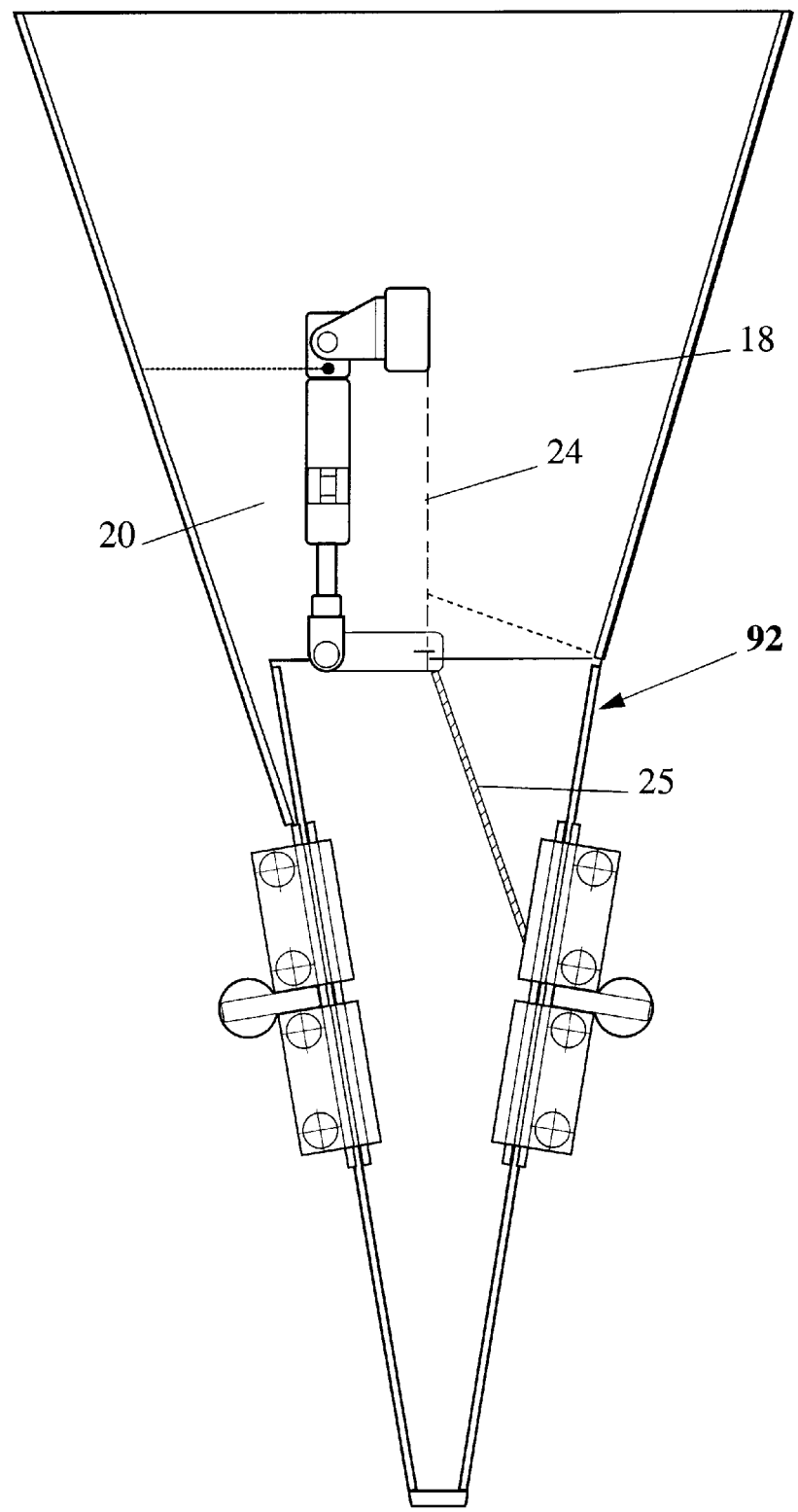
FIG. 7 is a rear view of a preferred delivery chute as shown in FIGS. 3 to 6.

At the base of the divider (24) which separates the dual paths (18) and (20), there is a hinged flap (25) (FIG. 7), which hinges left or right to allow access of plant and plug down either path (18) or path (20) (FIG. 8), depending on the planting sequence.

Figure 8:
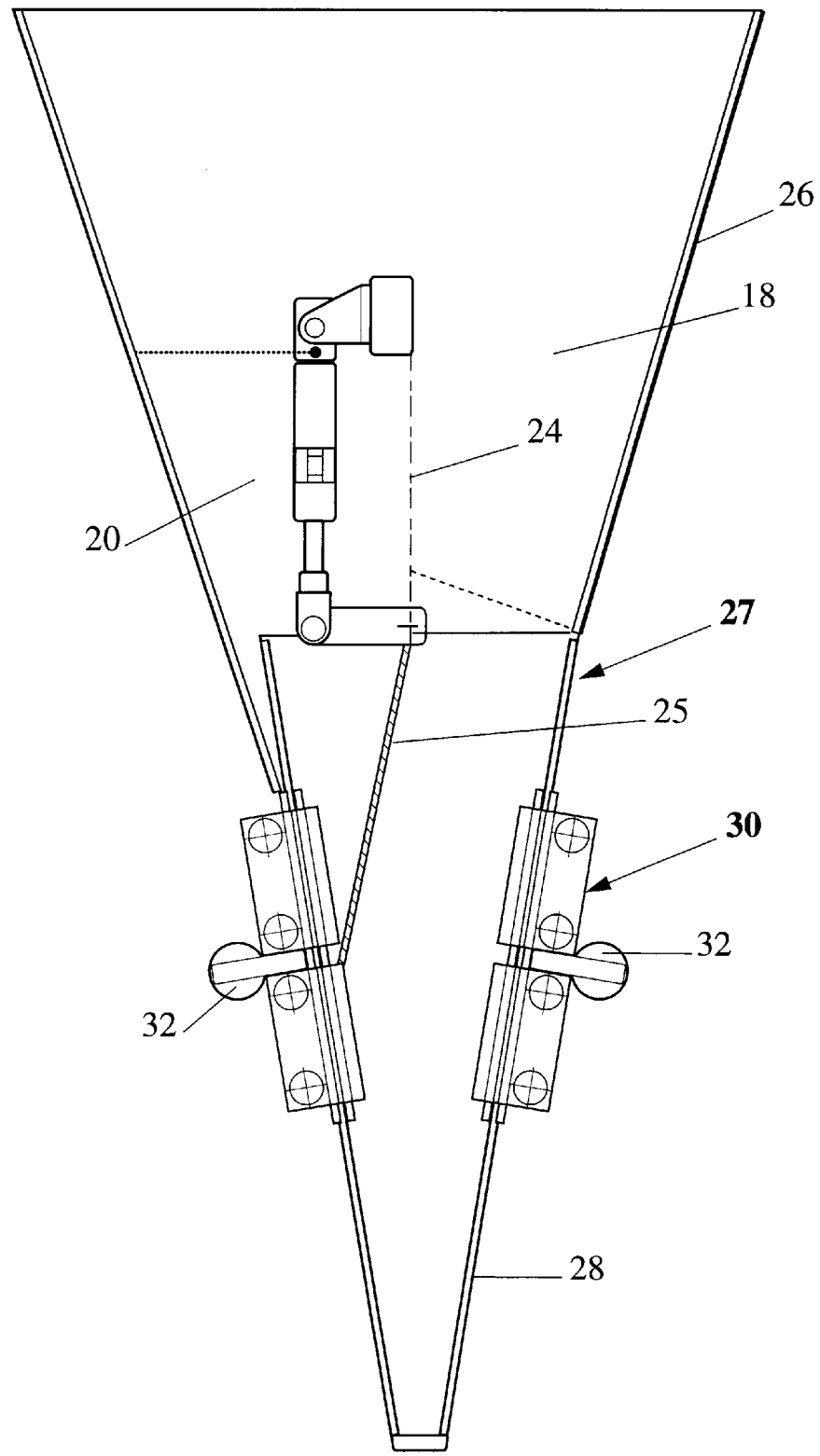
FIG. 8 is a second rear view similar to FIG. 7 but showing the delivery chute in a different configuration.
Figure 9:
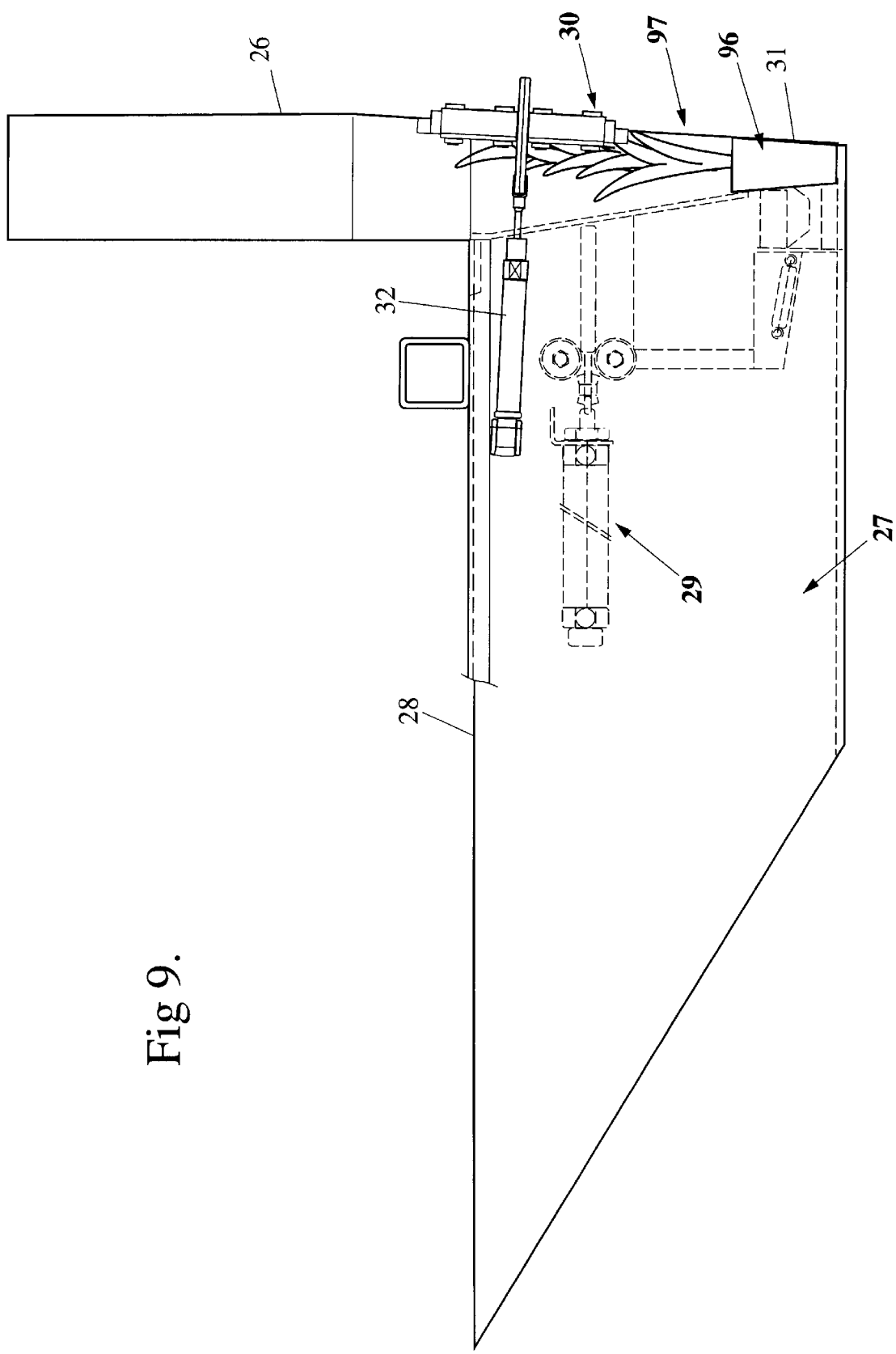
FIG. 9 is a side view of a preferred planting shoe in combination with a plant delivery chute.
Figure 10:
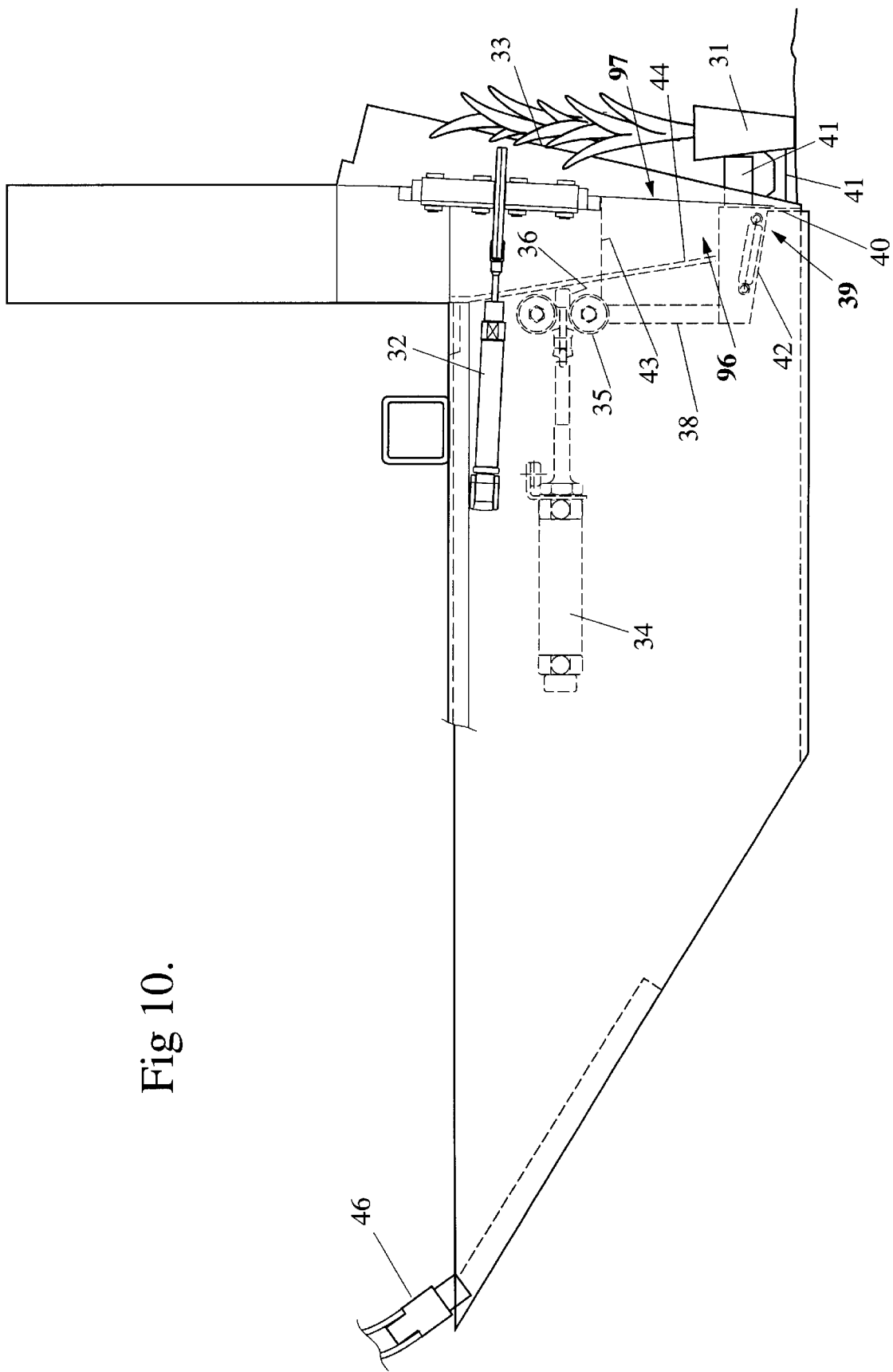
FIG. 10 is a side view similar to FIG. 9 showing the plant discharged from the rear of the assembly.
Figure 11:
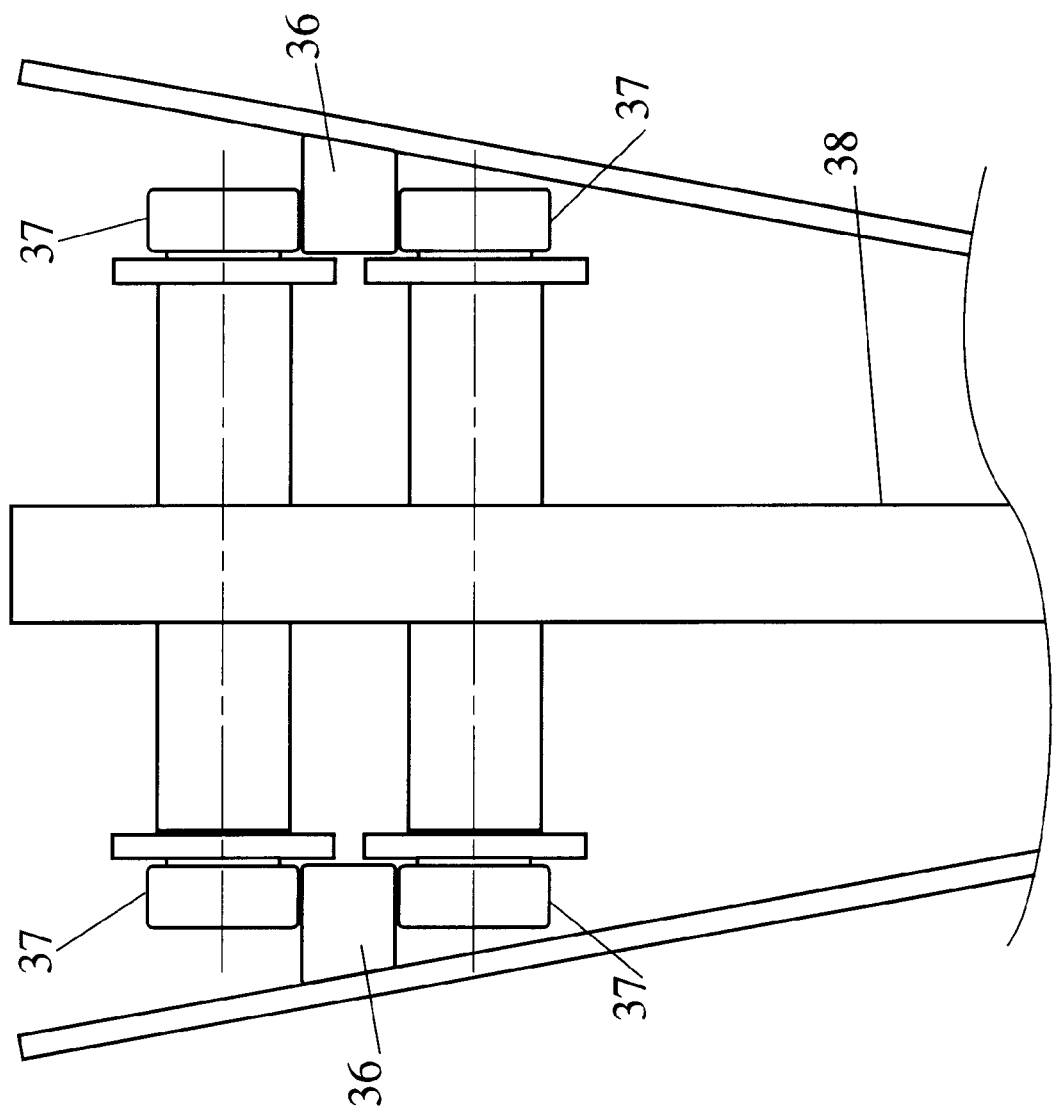
FIG. 11 is a partial transverse section view showing part of a plant pusher assembly for delivering a plant rearwardly to a planting position.
Figure 12:
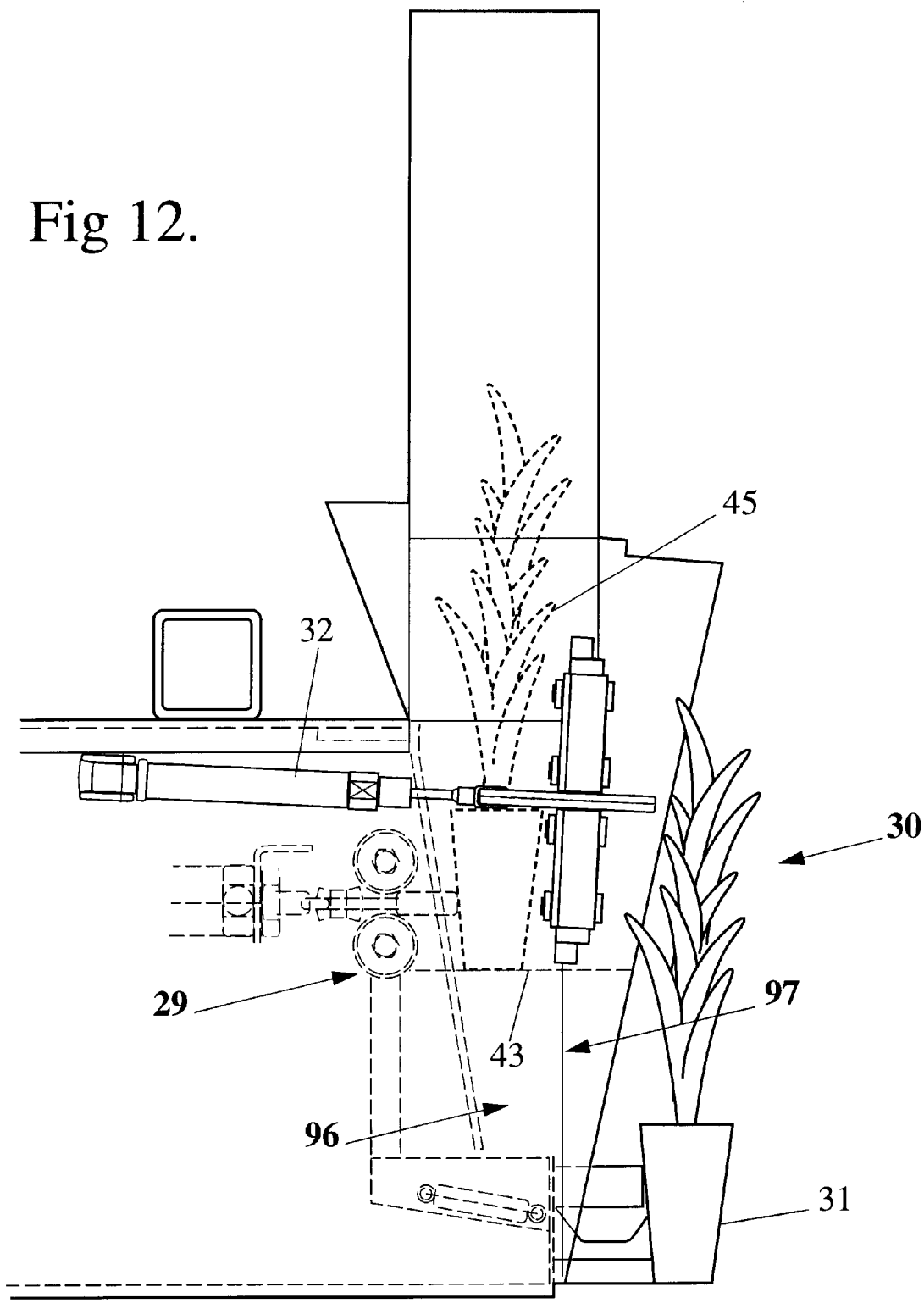
FIG. 12 is a partial side view of the planting shoe and delivery chute in accordance with one preferred embodiment.
Figure 13:
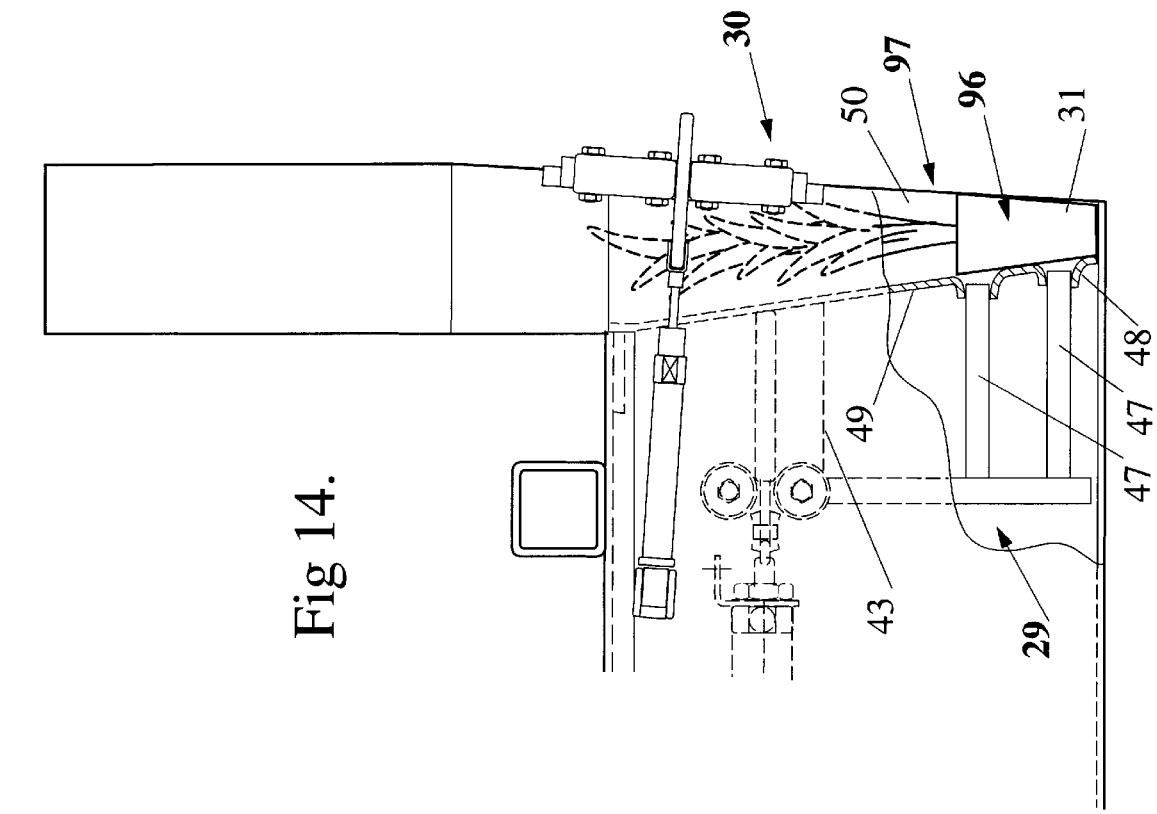
FIG. 13 is a rear view of FIG. 12 with the vertical doors closed.

From the dual path input receptacle (26) the plant drops down into the soil opening/planting shoe (FIGS. 8 and 9). The shoe assembly (27) consists of a keel shaped structure (28) having a forward end (95) which structure (28), besides containing the plant eject mechanism assembly (29) and the dual path plant receptacle (26), also contains the twin plant retaining door assembly (30) as further described hereinafter, When the plant (31) has been dropped into a receiving zone (96) the rear (97) of the shoe assembly (27), which has an internal profile which matches the profile of the plug, the twin rear door actuators (32) are activated. This causes the twin retaining doors (33) to open which allows the ejection of the plant and plug. The plant eject mechanism (29) pushes the plant out into the furrow (58) (FIG. 18) left by the shoe. The shoe leaves a furrow very similar to a boats wake and it is important that the eject mechanism pushes the plant far enough back into the 'wake' to where the soil is beginning to close in again, (FIG. 18). The plant eject mechanism assembly consists of a pneumatic cylinder (34) (FIG. 10), which is connected to a roller frame (35) which runs on two guide rails (36) which are attached to the inside surface of the shoe (27). The roller frame (35) consists of four guide wheels (37) (FIG. 11), which run on the guides (36). Directly below the roller carriage and connected to the carriage by a vertical member (38) is the plant ejector assembly (39), (FIG. 10). This ejector is made up of a spring loaded, hinged vertical rear panel (40) onto which the plant pushing members (41) are connected. The rear panel (40) is spring loaded so that it can be self-cleaning. If any foreign material makes its way into the shoe the rear panel, on retraction, can hinge open and on the outstroke hinges shut and pushes the foreign material out with the plug/plant that it is ejecting. Situated directly above the plant pushing members (41) and connected to the vertical connecting member (38), is a horizontal plate (43) which has two functions. The first function is that as the plant eject mechanism is extended the plate passes through a slot in the rear panel (44) of the shoe plant receptacle and pushes against the foliage of the plant being ejected, therefore supporting the plant/plug, holding it in a vertical position and stopping it from overturning during the rapid acceleration of the plant eject sequence. It also can act as a means of mechanical separation (FIG. 12) of the plants being planted by catching a subsequent plant and stopping it from falling onto the plant being planted or onto the plug planting mechanism prior to it being fully retracted. Once the plant has been planted the doors (33) close, ready to receive the next plant (FIG. 13).

In one preferred embodiment, a water hose nozzle (46) (FIG. 10) can be mounted at the front of the shoe and descending internally in the shoe and by this means the shoe can be periodically flushed out if required and/or used as a plant watering device.

Figure 14:
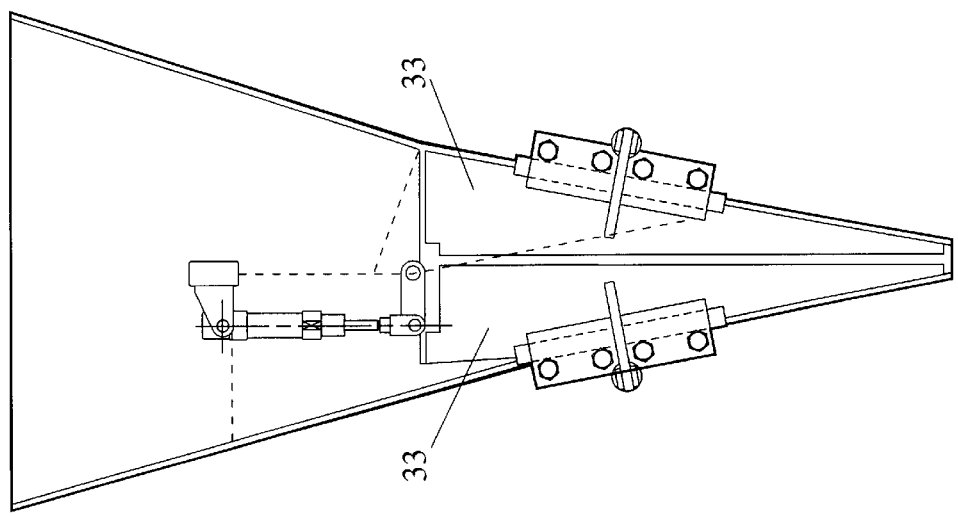
FIG. 14 is a view similar to FIG. 12 but showing the rear doors closed.
Figure 15:
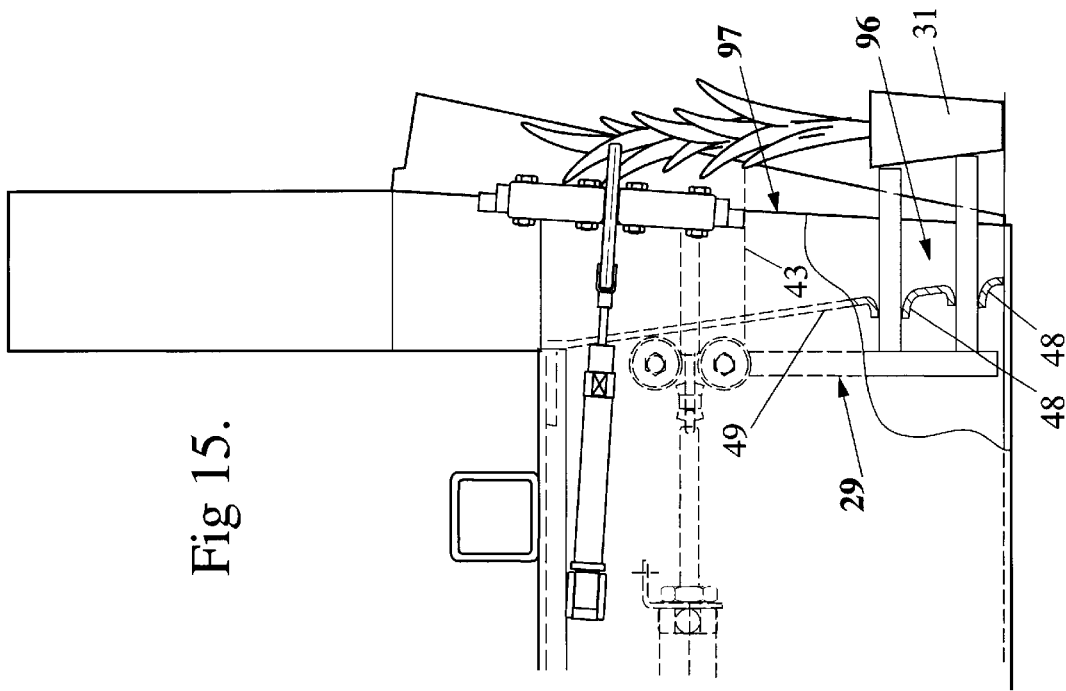
FIG. 15 is a view similar to FIG. 12 but showing a different embodiment of a pusher member.

In another preferred embodiment the plant ejection means can be achieved by using, instead of the spring loaded hinged self cleaning door as described above, two short lengths of square, rectangular or round bar (47) (FIG. 14) which push on the plug (31) yet are mounted above the floor of the shoe which stops any soil from being dragged back into the shoe on ejector retraction. The push rods slide through guide bushes (48) in the front wall (49) of the plant receptacle, thus ensuring no foreign material is brought back inside the shoe. FIG. 15 shows the plant being ejected from the soil-opening device. It also shows that the plant pushing rods (47) remain clear of any contact with the soil, consequently remaining clean, the only exception being the face of the rods (47) which are in contact with the plug. These are wiped clean when the rods are retracted through the scraper bushes (48).

Figure 16:
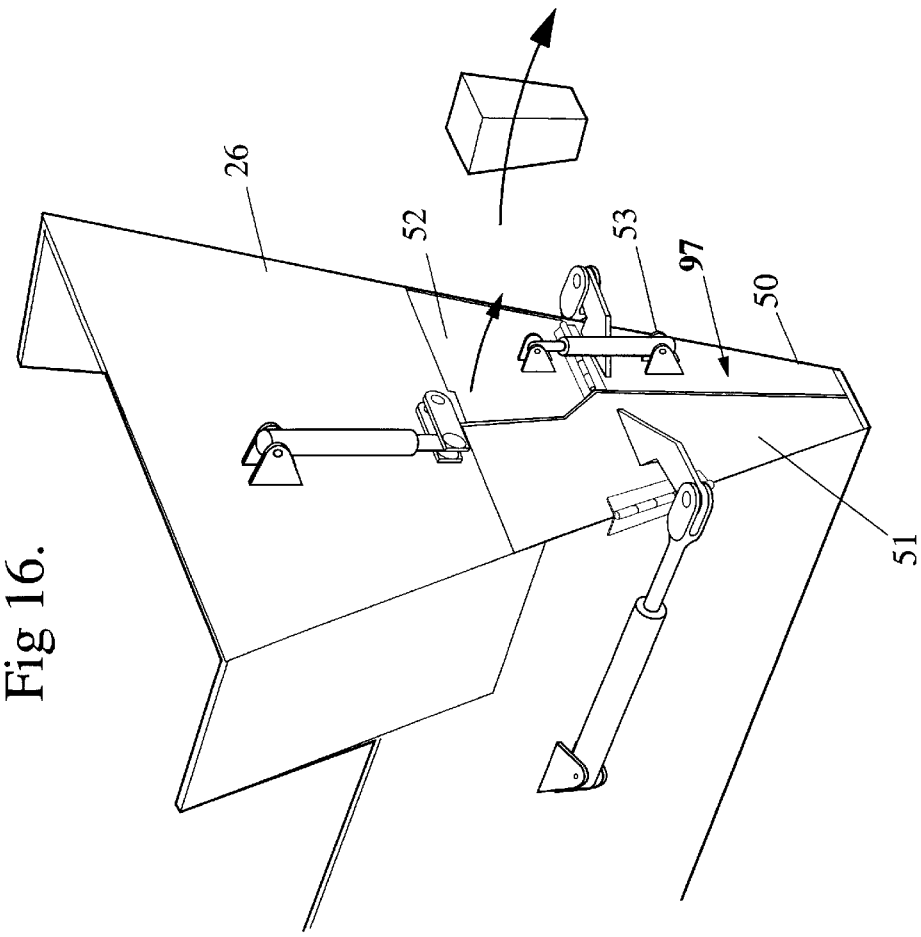
FIG. 16 is a perspective view of the rear regions of the planting shoe and delivery chute showing one form of dud plant plug rejecting mechanism.

In one embodiment, the twin rear doors (50 and 51) (FIG. 16) can be supplied with a plug eject mechanism (52). The plant/plugs are scanned to check if there are any plugs without plants then, if a plug without a plant is detected the belt is accelerated to 'gap up' and the plug is dispensed into the dual path plant receptacle (26) and ejected by the plug eject door (52) which is operated by a pneumatic cylinder (53) and is part of one of the twin plant retaining doors (50, 51). When a plug with no plant (54) is detected the door (52) hinges inwardly (FIG. 17) and catches the dropped plug (54). Immediately this happens the door hinges outwardly and physically ejects the plug out of the planting receptacle. The rear retaining doors (50, 51) completely retain the plug/plant in the planting shoe, protecting it from the passage of soil and any external influences.

FIG. 18 shows a plan view of the 'wake' (55) that the shoe assembly (27) leaves in the soil. The eject mechanism (56) pushes the plug (57) out into the 'wake' to the point (58) where the soil begins to close around the plug and subsequently is compressed and tamped by the following tamping wheels.

Figure 20:
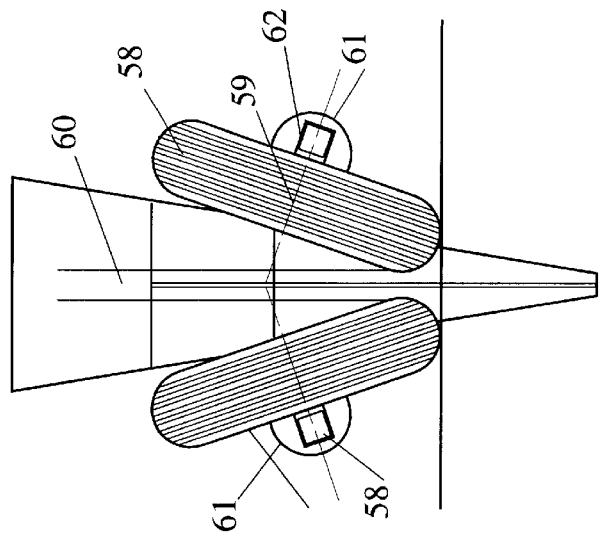
FIG. 20 is a schematic rear view of FIG. 19.
Figure 19:
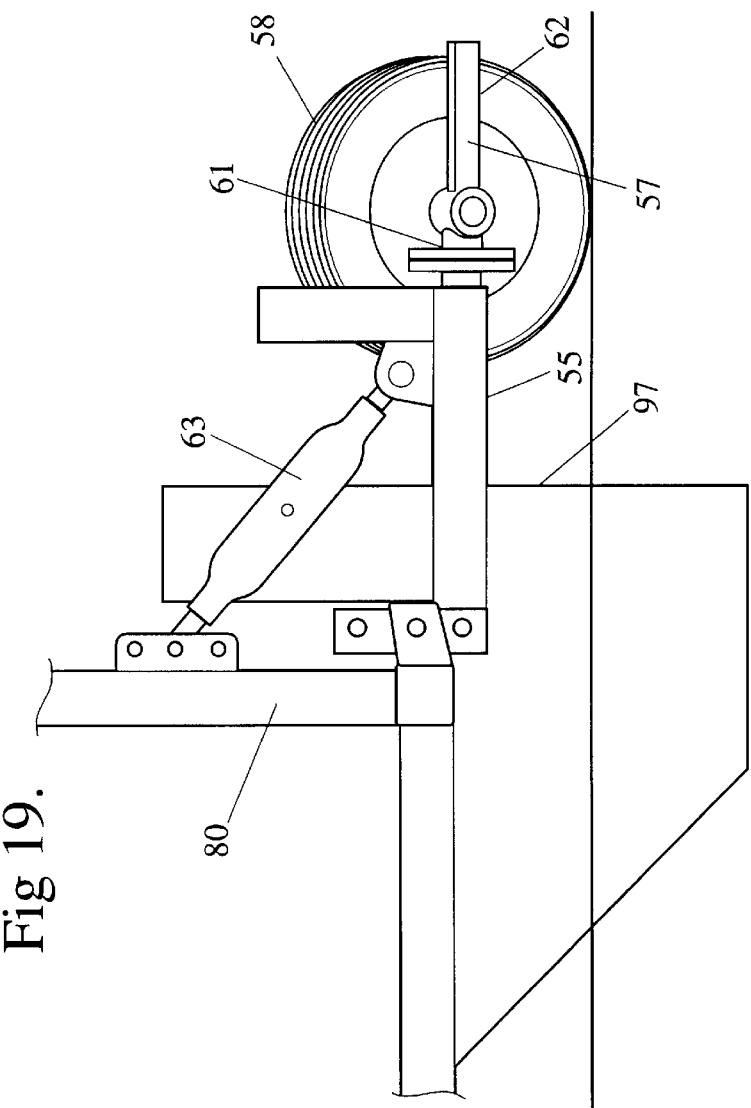
FIG. 19 is a partial side view of a first preferred form of soil closure mechanism.

After the plant has been ejected into the furrow behind the shoe the soil needs to be compressed and tamped in around the planted plant. This can be achieved in a number of ways. In one preferred embodiment a pair of pneumatic, smooth skinned or self-cleaning ribbed tired wheels can be used. A frame (55) (FIG. 19) is pivotally mounted, to the transplanter main frame (80). This frame consists of a slider assembly (57) onto which the two pneumatic tired wheels (58) are mounted. This slider assembly allows the wheels to be adjusted to vary the distance behind the soil opening shoe so that an optimum setting can be utilised for the correct compression and tamping of the soil around the plug/plant. The wheels are also adjustable along the axis of their axles (59) (FIG. 20) to increase or decrease the distance between the two wheels at (60). These wheels are outwardly cambered on the vertical plain (FIGS. 20 and 22). The camber can be altered by rotating the disc (61) and arm (62) on which the wheels (58) are connected by axles. This camber causes the soil to be transferred inwardly at the point of contact of the wheels and the soil, which ensures that soil flows and is transferred around the planted plug correctly planting the plant. The wheels also have the desired effect of not only placing soil around the plant but also compresses and tamps the soil down ensuring that the plug/plant is bedded correctly into the ground. The depth and pressure can be regulated by means of a turn buckle type connection (63) between the transplanter main frame and the tamping wheel frame (55).

Figure 23:
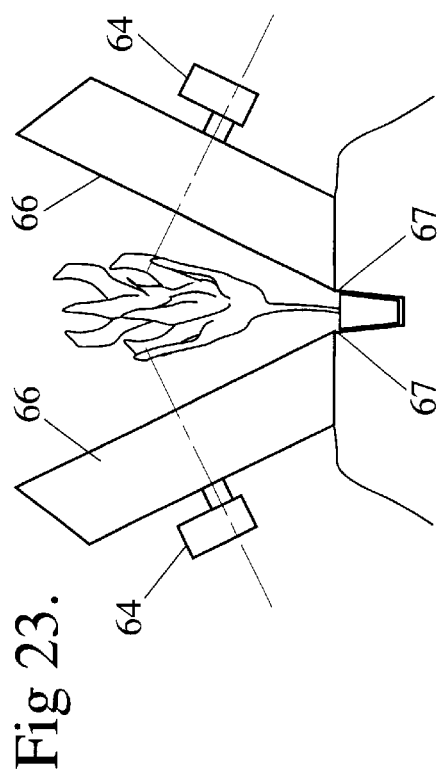
Figure 24:
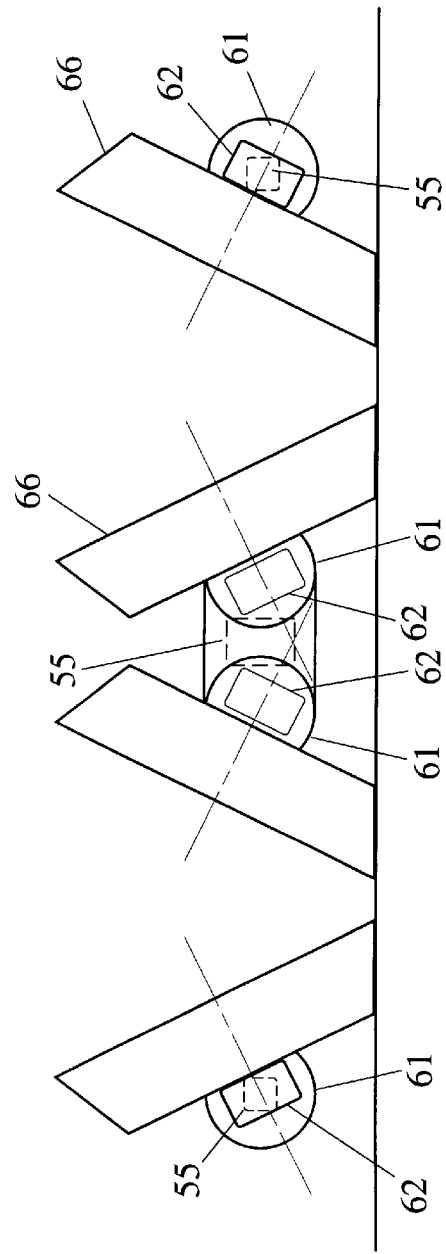
FIG. 24 is a view similar to FIG. 23 but showing a tandem soil closure arrangement.
Figure 25:
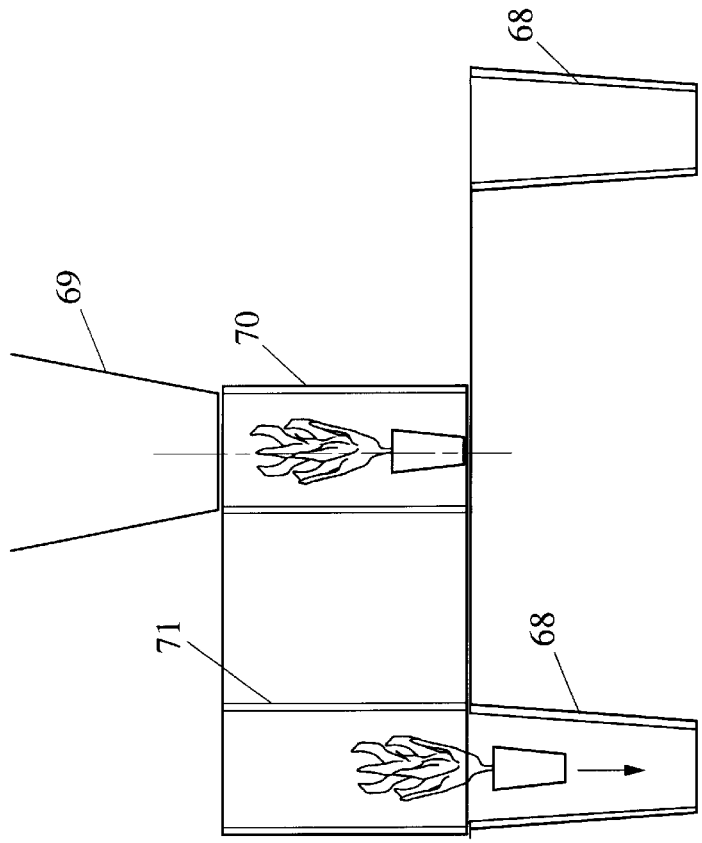
Figure 26:
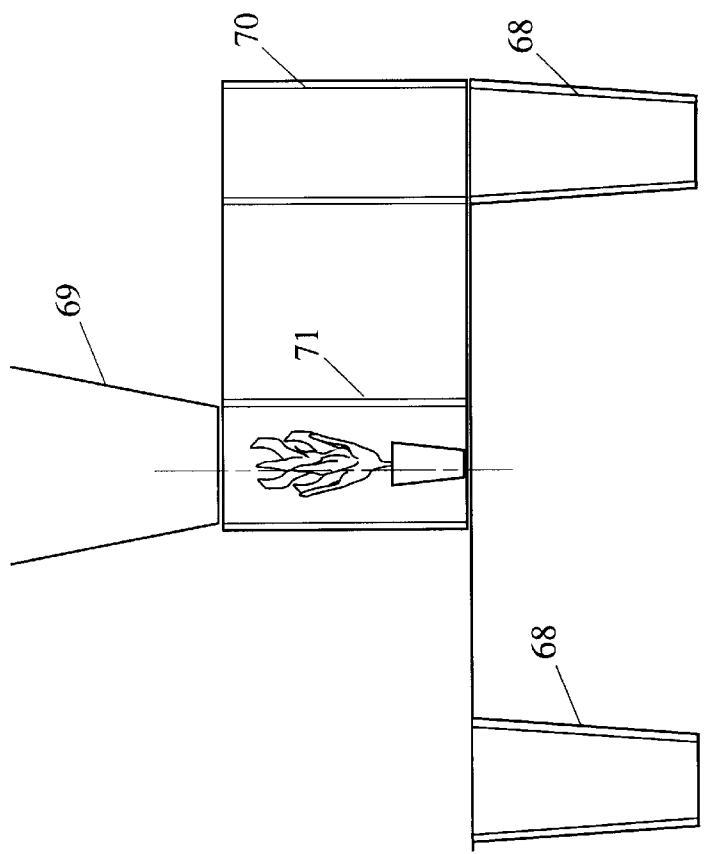
Figure 28:
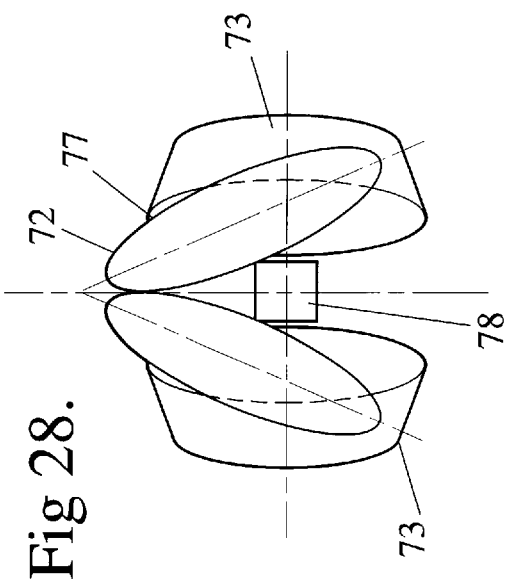
FIGS. 28 and 29 are schematic rear and side views of an embodiment utilising discs to form a planting furrow rather than a planting shoe.
Figure 27:
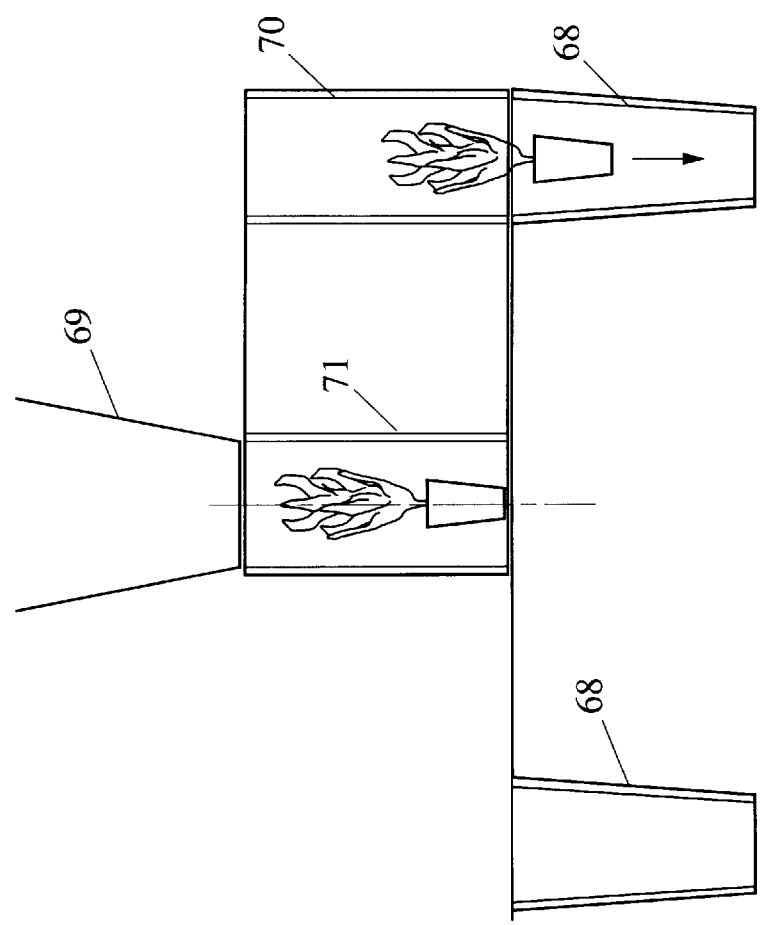

In another preferred embodiment a tandem set of small diameter wheels (FIG. 21) are mounted on a rocker arm (64). Each set of two or more wheels (65) are independently mounted on each rocker arm thus ensuring a stable load carrying assembly. The rocker arm (64) is pivotally connected to a sub frame (81) which is longitudinally adjustable relative to the frame (55). In another embodiment the two rear opposing wheels (66) can be cone shaped (FIGS. 23). These wheels are adjustable on their axis to provide the placement of the inner edge (67) of the lower portion of the cone in the desired location relative to the plug and plant. The angle of these cone shaped wheels can be altered to any desired bed shape including an absolutely flat bed. For close proximity row planting dual frames can be used (FIG. 24). In a further embodiment a number of either cones or pneumatic tired wheels, or a combination of cones and pneumatic tired wheels, can be used to provide the desired flotation required soil compaction and bed shape. Another form of plant receiving receptacle (FIG. 25) can be used to receive plugs and plants from one feed point and transferred to two planting positions, when the planting rows are close together. Mounted between the soil opening shoes (68) and the plant receiving receptacle (69) are two vertical drop tubes (70) and (71) which can be slid from side to side by means of a pneumatic cylinder (not shown). When a plant is dropped into drop tube (71) it immediately slides to the left and the plant drops down into the left-hand shoe (68) (FIG. 26). While this is happening the drop tube (70) which is mechanically connected to the tube (71), is positioned under the plant receiving receptacle (69) and has a plant dropped into it. Simultaneously as the plant drops from tube (71) to a soil opening shoe another plant has been dropped from the plant retaining receptacle into the right drop tube (70) the frame moves to the right and drops the plant in shoe (68) (FIG. 27). The cycle is repeated alternating planting to form a diamond pattern. As the drop tubes (70 and 71) are relatively short and are vertical with two plants being transferred vertically from (69) to (70) and from (71) into (68) simultaneously, very little time is lost as the tubes remain vertical and are pneumatically moved horizontally at high speed. This allows for wide twin row planting from a single feed point.

In another preferred furrow opening and tamping wheel embodiment (FIG. 29) shown in plan elevation, twin rotating discs (72) tapered outwardly at the top on the vertical plane and tapered outwardly at the back on the horizontal plane engage in the soil and form a furrow for the plant to be planted into. On the outside of these twin rotating discs

Figure 29:
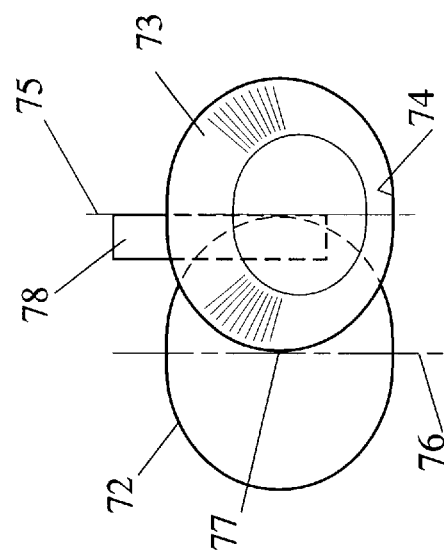

(72) and at the same plane vertically are a pair of tamping wheels (73) which compress the soil down around the planted plant (74) (FIG. 29). The centre line (75) of these tamping wheels (73) are substantially further behind the centre line (76) of the furrow opening wheels (72) which allow for the tamping wheel front frontal radius (77) to slightly engage on the external face of the furrow opening discs (72) therefore cleaning any mud buildup of these discs (72) via a rotating mud scraping and self cleaning action. Running vertically between these furrow-forming discs is the plant drop tube (78) (FIG. 30), with a hinged rear panel (79), which is connected to a pneumatic cylinder (90). Once a plant is engaged in the base of the drop tube (78) the cylinder is actuated and kicks the plug and plant out into the furrow, and subsequently the tamping wheels compress and bed in the soil around the plant. In another embodiment (FIG. 31) shows a hinged, pivoted front door (126), which when actuated by a pneumatic cylinder (132) sweeps the plug and plant (127) off a base plate (128) which is connected to and supported by the two vertical side walls (129). The rear of the eject mechanism is also covered by a hinged door (130). This ensures that the plug and plant are securely retained on all four sides within the eject mechanism prior to ejection. As the plug and plant (127) (FIG. 32) is ejected by the front hinged door (126), door (130) lifts up, being actuated by a pneumatic cylinder (131), allowing clear access of the plug and plant into the soil.

Figure 33:
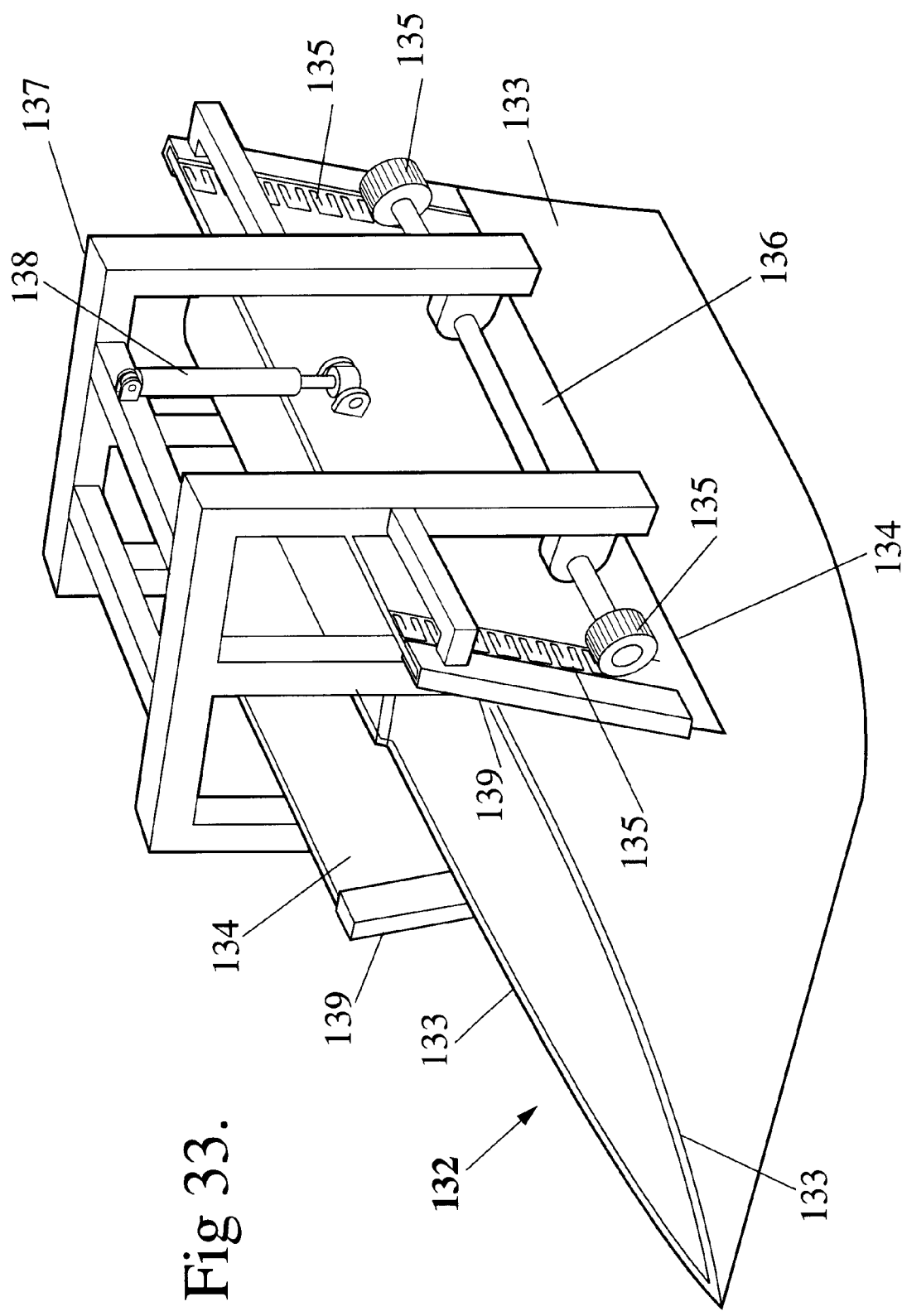
FIG. 33 illustrates a possible arrangement for cleaning the outside of a planting shoe.

In another preferred embodiment for cleaning mud off soil opening means, is the use of side scrapers on the soil opening shoe (FIG. 33). In this embodiment, the soil opening shoe assembly, being a keel shaped structure (132) with vertically tapered, reasonably straight sides (133) can be fitted with two, one each side, scrapers (134). These scrapers are connected via a rack and pinion (135) and through shaft (136) to framework (137) and operated by a pneumatic cylinder (138) and guided by guides (139). Once activated the cylinders push the scraper, which engages slightly on the sides of the shoe, downward and consequently scrape off any mud build up on the sides of the shoe (132). The operation of this scraper is controlled by the microprocessor and can be programmed to function at a set distance traveled or at a set number of plants planted.

What I claim is:

1. Apparatus for planting plants sequentially in a prepared ground planting position, said apparatus including means for introducing the plants for planting into a delivery chute leading to a location adjacent to the planting position, said apparatus including conveying means adapted to carry a plurality of said plants sequentially positioned and to eject same sequentially into an inlet region of said delivery chute, said conveying means being bodily moveable between a first position adapted to receive a plurality of said plants and a second position at or adjacent the inlet region of said delivery chute, and control means to sequentially eject at least one of said plants into said delivery chute while said conveying means is moving towards or is at said second position and to sequentially eject at least one of said plants into said delivery chute while said conveying means is moving towards or is at said first position, said apparatus further including a planting shoe adapted to form said ground planting position, said planting shoe including a furrow forming forward end, a shell, means to receive one of said plants within said shell from the delivery chute, and a rear end, said planting shoe further including pusher means to eject said one of said plants rearwardly through the rear end of said shell into said furrow behind the shoe.

2. Apparatus according to claim 1, wherein said planting shoe further includes closure means to close the rear end of said shell, said closure means being openable when it is desired to eject said one of said plants from said shell, said closure means being initially closed when said one of said plants is received into said shell from the delivery chute.

3. Apparatus according to claim 2, wherein two vertically hinged door members form said closure means.

4. Apparatus according to claim 1, wherein said one of said plants includes a growing medium plug and foliage and wherein pusher means includes a first part for engaging the foliage of said one of said plants and a second part for engaging the growing medium plug of said one of said plants as said one of said plants is moved rearwardly of the planting shoe toward said furrow.

5. Apparatus according to claim 4, wherein the first part of said pusher means traverses said delivery chute when engaging the foliage of that one of said plants being moved to said furrow behind the shoe, said first part acting to retain a second plant delivered along said delivery chute in a retained position outside said shell as said one of said plants is moved to said furrow.

6. Apparatus according to claim 5, further including sensing means to determine if a plant plug at or approaching said retained position has a live plant viable for planting, and reject means to discharge said plant plug from said retained position without passing to said plant eject position if said sensing means determines the plant plug does not include a live or viable plant.

7. Apparatus according to claim 1, wherein the pusher means is adapted to engage and move said one of said plants rearwardly during a planting operation, said pusher means including at least a lower portion which is adapted to hinge upwardly during a reverse stroke of the pusher means.

8. Apparatus according to claim 1, wherein the pusher means includes a member having a plant plug engaging part and plant foliage engaging part, and an actuator, said actuator being located above at least the plant plug engaging.

9. Apparatus according to claim 8, wherein the actuator is located above the plant foliage engaging part.

10. A planting shoe for use with apparatus for planting plants in a prepared ground position, said planting shoe including a furrow forming shell, means to receive said one of said plants within said shell from a plant delivery means of the planting apparatus, sensing means to determine that a plant plug supplied by said plant delivery means includes a live or viable plant for planting, and reject means to discharge said plant plug if said sensing means determines the plant plug does not include a live or viable plant, said planting shoe further including a pusher means to eject said one of said plants received from said plant delivery means rearwardly of said shoe into said furrow.

11. A planting shoe for use with apparatus for planting plants in a prepared ground position, said planting shoe including a furrow forming shell and means to receive one of said plants within said shell from a plant delivery means of the planting apparatus, said planting shoe further including closure means to close a rear region of said shell which is openable when it is desired to eject said one of said plants therefrom, said closure means being initially closed when said one of said plants is received into said shell from the plant delivery means, said closure means being formed by two vertically disposed door members, each of which is hinged for movement about upright axes when being opened and closed.

12. A planting shoe for use with apparatus for planting plants sequentially in a prepared ground position, said planting shoe including a furrow forming shell and means to receive one of said plants within said shell from a plant delivery means of the planting apparatus, said planting shoe further including a pusher means including a first part adapted to engage foliage of said one of said plants and a second part adapted to engage a growing medium plug of said one of said plants as said one of said plants is moved rearwardly of the planting shoe during a planting operation, said first part being arranged to retain a subsequent one of said plants from said plant delivery means while pushing a preceding one of said plants rearwardly of the planting shoe.

13. A planting shoe for use with apparatus for planting plants in a prepared ground position, said planting shoe including a furrow forming shell and means to receive one of said plants within said shell from a plant delivery means of the planting apparatus, said planting shoe further including reciprocable pusher means adapted in a stroke in one direction to engage and move said one of said plants rearwardly during a planting operation, said pusher means including at least a lower portion which is adapted to hinge upwardly during a reverse stroke of the pusher means.

14. A ground planting device including a furrow forming means to prepare a ground planting furrow, a plant delivery chute to sequentially receive plants for planting and to deliver same to a lower discharge end of said delivery chute located within or adjacent to the ground planting furrow, ground closure means to progressively close said ground planting furrow, and plant discharge means to push said plants from the lower discharge end of said delivery chute rearwardly to position a plug of growing medium associated with each of said plants into engagement with a point of closure of said ground planting furrow by said ground closure means, said plant discharge means including a plant retainer means arranged to retain a subsequent plant received along said delivery chute as a previously received plant is pushed towards said point of closure of said ground planting furrow.

15. A ground planting device according to claim 14, wherein the furrow forming means comprises at least one ground engaging disc.

16. A ground planting device according to claim 14, wherein the furrow forming means includes a planting shoe.

17. A ground planting device according to claim 16, wherein the planting shoe has a furrow forming forward end, a shell, means to receive one of said plants within said shell from the delivery chute, and a rear end, said planting shoe further including a pusher means forming part of the plant discharge means to push said one of said plants rearwardly through the rear end of said shell to said point of closure of the ground planting furrow.

18. Apparatus for planting sequentially a plurality of plants each having a plant plug, in a prepared ground planting position, said apparatus including means for introducing the plants for planting into a delivery chute leading to a location adjacent to the planting position, reject means being provided to discharge from said delivery chute any of said plant plugs determined by sensing means not to include a live or viable plant for planting, said apparatus including conveying means adapted to carry a plurality of said plants sequentially positioned and to eject same sequentially into an inlet region of said delivery chute, said conveying means being bodily moveable between a first position adapted to receive a plurality of said plants and a second position at or adjacent the inlet region of said delivery chute, and control means to sequentially eject at least one of said plants into said delivery chute while said conveying means is moving towards or is at said second position and to sequentially eject at least one of said plants into said delivery chute while said conveying means is moving towards or is at said first position, said apparatus further including a planting shoe adapted to form said ground planting position, said planting shoe including a furrow forming forward end, a shell, means to receive one of said plants within said shell from the delivery chute, and a rear end, said planting shoe further including a pusher means to eject said one of said plants rearwardly through the rear end of said shell into a furrow formed by said shoe.

19. Apparatus according to claim 18, wherein said planting shoe further includes closure means to close the rear end of said shell, said closure means being openable when it is desired to eject one of said plants therefrom, said closure means being initially closed when one of said plants is received in said shell from the delivery chute.

20. Apparatus according to claim 19, wherein two vertically hinged door members form said closure means.

21. Apparatus according to claim 18, wherein said pusher means includes a first part adapted to engage foliage of said one of said plants and a second part adapted to engage the plant plug of said plant as the plant is moved rearwardly of the planting shoe during a planting operation.

22. Apparatus according to claim 21, wherein the first part of said pusher means traverses said delivery chute when engaging and pushing the plant foliage of the plant being moved to said point of closure of ground soil behind the shoe, said first part acting to retain a second said plant plug delivered along said delivery chute in a retained position ready to move into a plant eject position when said first part is withdrawn following a planting operation.

23. Apparatus according to claim 22, wherein said sensing means is disposed to determine if a plant plug at or approaching said retained position has a live plant viable for planting, said reject means acting to discharge a said plant plug from said retained position upstream of said plant eject position if said sensing means determines the plant plug does not include a live or viable plant.

24. Apparatus according to claim 18, wherein the pusher means is adapted to engage and move said plant plug rearwardly during a planting operation, said pusher means including at least a lower portion which is adapted to hinge upwardly during a reverse stroke of the pusher means.

25. Apparatus according to claim 18, wherein the pusher means includes a plant plug engaging part and at least one rod member passing through a wall section forming an inner wall of the delivery chute, said rod member being reciprocable through a guide bush adapted to prevent ingress of ground soil or the like into the shell of said planting shoe.

26. Apparatus according to claim 18, wherein the pusher means includes a member having a plant plug engaging part and plant foliage engaging part, and an actuator, said actuator being located above at least the plant plug engaging part.

27. Apparatus according to claim 26, wherein the actuator is located above the plant foliage engaging part.

* * * * *